United States Patent
Karadayi et al.

(10) Patent No.: US 11,798,247 B2
(45) Date of Patent: Oct. 24, 2023

(54) VIRTUAL OBJECT STRUCTURES AND INTERRELATIONSHIPS

(71) Applicant: Meta Platforms Technologies, LLC, Menlo Park, CA (US)

(72) Inventors: Yeliz Karadayi, Seattle, WA (US); Wai Leong Chak, London (GB); Michal Hlavac, Seattle, WA (US); Pol Pla I Conesa, San Francisco, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/511,909

(22) Filed: Oct. 27, 2021

(65) Prior Publication Data

US 2023/0126837 A1    Apr. 27, 2023

(51) Int. Cl.
*G06T 19/20*    (2011.01)
*G06T 19/00*    (2011.01)
*G06F 16/22*    (2019.01)

(52) U.S. Cl.
CPC .......... *G06T 19/20* (2013.01); *G06F 16/2291* (2019.01); *G06T 19/006* (2013.01); *G06T 2200/24* (2013.01); *G06T 2219/2008* (2013.01)

(58) Field of Classification Search
CPC ... G06T 19/20; G06T 19/006; G06T 2200/24; G06T 2219/2008; G06F 16/2291
See application file for complete search history.

(56) References Cited

U.S. PATENT DOCUMENTS

| 770,149 A | 9/1904 | Bailey |
|---|---|---|
| 3,055,404 A | 9/1962 | Anderson |

(Continued)

FOREIGN PATENT DOCUMENTS

| EP | 2887322 B1 | 2/2020 |
|---|---|---|
| JP | 2022147265 A | 10/2022 |

(Continued)

OTHER PUBLICATIONS

Hincapie-Ramos J.D., et al., "GyroWand: IMU-Based Raycasting for Augmented Reality Head-Mounted Displays," Proceedings of the 3rd Association for Computing Machinery (ACM) Symposium on Spatial User Interaction, Los Angeles, CA, USA, Aug. 8-9, 2015, pp. 89-98.

(Continued)

*Primary Examiner* — Chong Wu
(74) *Attorney, Agent, or Firm* — Potomac Law Group, PLLC

(57) ABSTRACT

A virtual object system can orchestrate virtual objects defined as a collection of components and with inheritance in an object hierarchy. Virtual object components can include a container, data, a template, and a controller. A container can define the volume the virtual object is authorized to write into. A virtual object's data can specify features such as visual elements, parameters, links to external data, meta-data, etc. The template can define view states of the virtual object and contextual breakpoints for transitioning between them. Each view state can control when and how the virtual object presents data elements. The controller can define logic for the virtual object to respond to input, context, etc. The definition of each object can specify which other object in an object hierarchy that object extends, where extending an object includes inheriting that object's components, which can be modified or overwritten as part of the extension.

20 Claims, 24 Drawing Sheets

(56) References Cited

U.S. PATENT DOCUMENTS

| | | |
|---|---|---|
| 3,081,177 A | 3/1963 | Edward et al. |
| 3,117,274 A | 1/1964 | Pierre et al. |
| 3,292,089 A | 12/1966 | Earnest et al. |
| 3,477,368 A | 11/1969 | Spaulding et al. |
| 3,530,252 A | 9/1970 | Puente et al. |
| 3,558,759 A | 1/1971 | Sarem et al. |
| 3,726,233 A | 4/1973 | Swartz |
| 3,817,472 A | 6/1974 | Abe |
| 3,947,351 A | 3/1976 | Asawa et al. |
| 5,335,991 A | 8/1994 | Wobbe |
| 5,842,175 A | 11/1998 | Andros et al. |
| 6,842,175 B1 | 1/2005 | Schmalstieg et al. |
| 7,650,575 B2 | 1/2010 | Cummins et al. |
| 7,701,439 B2 | 4/2010 | Hillis et al. |
| 8,335,991 B2 | 12/2012 | Douceur et al. |
| 8,558,759 B1 | 10/2013 | Prada Gomez et al. |
| 8,726,233 B1 | 5/2014 | Raghavan |
| 8,947,351 B1 | 2/2015 | Noble |
| 9,055,404 B2 | 6/2015 | Setlur et al. |
| 9,081,177 B2 | 7/2015 | Wong et al. |
| 9,117,274 B2 | 8/2015 | Liao et al. |
| 9,292,089 B1 | 3/2016 | Sadek |
| 9,477,368 B1 | 10/2016 | Filip et al. |
| 9,530,252 B2 | 12/2016 | Poulos et al. |
| 9,817,472 B2 | 11/2017 | Lee et al. |
| 10,220,303 B1 | 3/2019 | Schmidt et al. |
| 10,248,284 B2 | 4/2019 | Itani et al. |
| 10,473,935 B1 | 11/2019 | Gribeiz et al. |
| 10,521,944 B2 | 12/2019 | Sareen et al. |
| 10,909,762 B2 | 2/2021 | Karalis et al. |
| 10,963,144 B2 | 3/2021 | Fox et al. |
| 11,017,609 B1 | 5/2021 | Buzzerio et al. |
| 11,126,320 B1 * | 9/2021 | Thompson ............ G06F 3/0482 |
| 11,176,755 B1 | 11/2021 | James et al. |
| 11,178,376 B1 | 11/2021 | Tichenor et al. |
| 11,238,664 B1 | 2/2022 | Tavakoli et al. |
| 11,651,573 B2 | 5/2023 | Tichenor et al. |
| 2008/0089587 A1 | 4/2008 | Kim et al. |
| 2009/0313299 A1 | 12/2009 | Bonev et al. |
| 2010/0251177 A1 | 9/2010 | Geppert et al. |
| 2010/0306716 A1 | 12/2010 | Perez |
| 2011/0267265 A1 | 11/2011 | Stinson |
| 2012/0069168 A1 | 3/2012 | Huang et al. |
| 2012/0143358 A1 | 6/2012 | Adams et al. |
| 2012/0188279 A1 | 7/2012 | Demaine |
| 2012/0206345 A1 | 8/2012 | Langridge |
| 2012/0275686 A1 | 11/2012 | Wilson et al. |
| 2012/0293544 A1 | 11/2012 | Miyamoto et al. |
| 2013/0051615 A1 | 2/2013 | Lim et al. |
| 2013/0063345 A1 | 3/2013 | Maeda |
| 2013/0069860 A1 | 3/2013 | Davidson |
| 2013/0117688 A1 | 5/2013 | Yerli |
| 2013/0125066 A1 | 5/2013 | Klein et al. |
| 2013/0147793 A1 | 6/2013 | Jeon et al. |
| 2013/0169682 A1 | 7/2013 | Novak et al. |
| 2013/0265220 A1 | 10/2013 | Fleischmann et al. |
| 2014/0125598 A1 | 5/2014 | Cheng et al. |
| 2014/0149901 A1 | 5/2014 | Hunter |
| 2014/0236996 A1 | 8/2014 | Masuko et al. |
| 2014/0268065 A1 | 9/2014 | Ishikawa et al. |
| 2014/0357366 A1 | 12/2014 | Koganezawa et al. |
| 2014/0375683 A1 | 12/2014 | Salter et al. |
| 2014/0375691 A1 | 12/2014 | Kasahara |
| 2015/0015504 A1 | 1/2015 | Lee et al. |
| 2015/0035746 A1 | 2/2015 | Cockburn et al. |
| 2015/0054742 A1 | 2/2015 | Imoto et al. |
| 2015/0062160 A1 | 3/2015 | Sakamoto et al. |
| 2015/0077592 A1 | 3/2015 | Fahey |
| 2015/0153833 A1 | 6/2015 | Pinault et al. |
| 2015/0160736 A1 | 6/2015 | Fujiwara |
| 2015/0169076 A1 | 6/2015 | Cohen et al. |
| 2015/0181679 A1 | 6/2015 | Liao et al. |
| 2015/0206321 A1 | 7/2015 | Scavezze et al. |
| 2015/0220150 A1 | 8/2015 | Plagemann et al. |
| 2015/0253862 A1 | 9/2015 | Seo et al. |
| 2015/0261659 A1 | 9/2015 | Bader et al. |
| 2015/0356774 A1 | 12/2015 | Gal et al. |
| 2016/0026253 A1 | 1/2016 | Bradski et al. |
| 2016/0063762 A1 | 3/2016 | Heuvel et al. |
| 2016/0110052 A1 | 4/2016 | Kim et al. |
| 2016/0147308 A1 | 5/2016 | Gelman et al. |
| 2016/0170603 A1 | 6/2016 | Bastien et al. |
| 2016/0180590 A1 | 6/2016 | Kamhi et al. |
| 2016/0378291 A1 | 12/2016 | Pokrzywka |
| 2017/0060230 A1 | 3/2017 | Faaborg et al. |
| 2017/0075420 A1 | 3/2017 | Yu et al. |
| 2017/0076500 A1 | 3/2017 | Maggiore et al. |
| 2017/0109936 A1 | 4/2017 | Powderly et al. |
| 2017/0139478 A1 | 5/2017 | Jeon et al. |
| 2017/0192513 A1 | 7/2017 | Karmon et al. |
| 2017/0242675 A1 | 8/2017 | Deshmukh |
| 2017/0243465 A1 | 8/2017 | Bourne, Jr. et al. |
| 2017/0262063 A1 | 9/2017 | Blenessy et al. |
| 2017/0278304 A1 | 9/2017 | Hildreth et al. |
| 2017/0287225 A1 | 10/2017 | Powderly et al. |
| 2017/0296363 A1 | 10/2017 | Yetkin et al. |
| 2017/0311129 A1 | 10/2017 | Lopez-Uricoechea et al. |
| 2017/0323488 A1 | 11/2017 | Mott et al. |
| 2017/0364198 A1 | 12/2017 | Yoganandan et al. |
| 2017/0372225 A1 | 12/2017 | Foresti |
| 2018/0059901 A1 | 3/2018 | Gullicksen |
| 2018/0095616 A1 | 4/2018 | Valdivia et al. |
| 2018/0107278 A1 | 4/2018 | Goel et al. |
| 2018/0113599 A1 | 4/2018 | Yin |
| 2018/0189647 A1 | 7/2018 | Calvo et al. |
| 2018/0300557 A1 | 10/2018 | Rodenas et al. |
| 2018/0307303 A1 | 10/2018 | Powderly et al. |
| 2018/0322701 A1 | 11/2018 | Pahud et al. |
| 2018/0335925 A1 | 11/2018 | Hsiao et al. |
| 2018/0357780 A1 | 12/2018 | Young et al. |
| 2019/0005724 A1 | 1/2019 | Pahud et al. |
| 2019/0094981 A1 | 3/2019 | Bradski et al. |
| 2019/0107894 A1 | 4/2019 | Hebbalaguppe et al. |
| 2019/0114061 A1 | 4/2019 | Daniels et al. |
| 2019/0155481 A1 | 5/2019 | DiVerdi et al. |
| 2019/0163700 A1 | 5/2019 | Baumgardner et al. |
| 2019/0172262 A1 | 6/2019 | McHugh et al. |
| 2019/0197785 A1 | 6/2019 | Tate-Gans et al. |
| 2019/0212827 A1 | 7/2019 | Kin et al. |
| 2019/0213792 A1 | 7/2019 | Jakubzak et al. |
| 2019/0235729 A1 | 8/2019 | Day et al. |
| 2019/0237044 A1 | 8/2019 | Day et al. |
| 2019/0258318 A1 | 8/2019 | Qin et al. |
| 2019/0278376 A1 | 9/2019 | Kutliroff et al. |
| 2019/0279424 A1 | 9/2019 | Clausen et al. |
| 2019/0279426 A1 | 9/2019 | Musunuri et al. |
| 2019/0286231 A1 | 9/2019 | Burns et al. |
| 2019/0340833 A1 | 11/2019 | Furtwangler et al. |
| 2019/0362562 A1 | 11/2019 | Benson |
| 2019/0369391 A1 | 12/2019 | Cordesses et al. |
| 2019/0377406 A1 | 12/2019 | Steptoe et al. |
| 2019/0377416 A1 | 12/2019 | Alexander |
| 2019/0377487 A1 | 12/2019 | Bailey et al. |
| 2019/0385371 A1 | 12/2019 | Joyce et al. |
| 2020/0066047 A1 | 2/2020 | Karalis et al. |
| 2020/0082629 A1 | 3/2020 | Jones et al. |
| 2020/0097077 A1 | 3/2020 | Nguyen et al. |
| 2020/0097091 A1 | 3/2020 | Chou et al. |
| 2020/0218423 A1 | 7/2020 | Ohashi |
| 2020/0219319 A1 | 7/2020 | Lashmar et al. |
| 2020/0225736 A1 | 7/2020 | Schwarz et al. |
| 2020/0225758 A1 | 7/2020 | Tang et al. |
| 2020/0226814 A1 | 7/2020 | Tang et al. |
| 2020/0279429 A1 | 9/2020 | Upadhyay et al. |
| 2020/0285761 A1 | 9/2020 | Buck et al. |
| 2020/0351273 A1 | 11/2020 | Thomas |
| 2020/0363924 A1 | 11/2020 | Flexman et al. |
| 2020/0363930 A1 | 11/2020 | Srinivasan et al. |
| 2021/0012113 A1 | 1/2021 | Petill et al. |
| 2021/0014408 A1 | 1/2021 | Timonen et al. |
| 2021/0097768 A1 | 4/2021 | Malia et al. |
| 2021/0192856 A1 | 6/2021 | Lee |
| 2021/0272375 A1 | 9/2021 | Lashmar et al. |
| 2021/0295602 A1 | 9/2021 | Scapel et al. |

(56) References Cited

U.S. PATENT DOCUMENTS

| | | | |
|---|---|---|---|
| 2021/0306238 | A1* | 9/2021 | Cheng .............. G06F 9/45533 |
| 2021/0390765 | A1 | 12/2021 | Laaksonen et al. |
| 2022/0068035 | A1 | 3/2022 | Tichenor et al. |
| 2022/0084279 | A1 | 3/2022 | Lindmeier et al. |
| 2022/0091722 | A1 | 3/2022 | Faulkner et al. |
| 2022/0101612 | A1 | 3/2022 | Palangie et al. |
| 2022/0121344 | A1 | 4/2022 | Pastrana Vicente et al. |
| 2022/0139052 | A1 | 5/2022 | Tavakoli et al. |
| 2022/0261088 | A1 | 8/2022 | Pinchon et al. |
| 2022/0406021 | A1 | 12/2022 | Lebeau et al. |
| 2022/0414403 | A1 | 12/2022 | Hlavac et al. |
| 2023/0126837 | A1 | 4/2023 | Karadayi et al. |
| 2023/0127438 | A1 | 4/2023 | Karadayi et al. |
| 2023/0134355 | A1 | 5/2023 | Lansel et al. |
| 2023/0152851 | A1 | 5/2023 | Berliner et al. |
| 2023/0244755 | A1 | 8/2023 | Hlavac et al. |
| 2023/0260233 | A1 | 8/2023 | Goncalves et al. |

FOREIGN PATENT DOCUMENTS

| | | | |
|---|---|---|---|
| WO | 2018235371 | A1 | 12/2018 |
| WO | 2020226832 | A1 | 11/2020 |
| WO | 2022055822 | A1 | 3/2022 |

OTHER PUBLICATIONS

International Search Report and Written Opinion for International Application No. PCT/US2020/051763, dated Feb. 3, 2021, 11 Pages.

Invitation to Pay Additional Fees for International Application No. PCT/US2021/044098, dated Nov. 3, 2021, 15 pages.

Mayer S., et al., "The Effect of Offset Correction and Cursor on Mid-Air Pointing in Real and Virtual Environments," Proceedings of the 2018 CHI Conference on Human Factors in Computing Systems, Montreal, QC, Canada, Apr. 21-26, 2018, pp. 1-13.

Olwal A., et al., "The Flexible Pointer: An Interaction Technique for Selection in Augmented and Virtual Reality," Proceedings of ACM Symposium on User Interface Software and Technology (UIST), Vancouver, BC, Nov. 2-5, 2003, pp. 81-82.

Renner P., et al., "Ray Casting", Central Facility Labs [Online], [Retrieved on Apr. 7, 2020], 2 pages, Retrieved from the Internet: URL:http://www.techfak.uni-bielefeld.de/-tpfeiffe/lehre/VirtualReality/interaction/ray_casting.html.

Schweigert R., et al., "EyePointing: A Gaze-Based Selection Technique," Proceedings of Mensch and Computer, Hamburg, Germany, Sep. 8-11, 2019, pp. 719-723.

"Unity Gets Toolkit for Common AR/R Interactions," Unity XR interaction Toolkit Preview [Online], Dec. 19, 2019 [Retrieved on Apr. 7, 2020], 1 page, Retrieved from the Internet: URL: http://youtu.be/ZPhv4qmT9EQ.

International Search Report and Written Opinion for International Application No. PCT/US2021/044098, dated Jan. 4, 2022, 22 pages.

Broitman A., "Learn and Do More with Lens in Google Images," Oct. 25, 2018, Retrieved from the Internet: URL: https://www.blog.google/products/search/learn-and-do-more-lens-google-images/, 4 pages.

International Search Report and Written Opinion for International Application No. PCT/US2022/032288, dated Sep. 16, 2022, 11 pages.

Melnick K., "Google Rolls out New AR Features for Its Lens APP," May 28, 2019, Retrieved from the Internet: URL: https://vrscout.com/news/new-ar-features-google-lens/, 3 pages.

Fleury C., et al., "A Generic Model for Embedding Users' Physical Workspaces into Multi-Scale Collaborative Virtual Environments," 20th International Conference on Artificial Reality and Telexistence, Dec. 3, 2010, 8 pages.

International Search Report and Written Opinion for International Application No. PCT/US2022/045510, dated Jan. 19, 2023, 10 pages.

Vitzthum A., "SSIML/Behaviour: Designing Behaviour and Animation of Graphical Objects in Virtual Reality and Multimedia Applications," Proceedings of the Seventh IEEE International Symposium on Multimedia, Dec. 12, 2005, 9 pages.

International Preliminary Report on Patentability for International Application No. PCT/US2021/044098, dated Mar. 9, 2023, 18 pages.

International Search Report and Written Opinion for International Application No. PCT/US2022/053780, dated Mar. 20, 2023, 10 pages.

International Search Report and Written Opinion for International Application No. PCT/US2023/021312, dated Aug. 24, 2023, 15 pages.

Wikipedia, "Multiple-document Interface," May 8, 2022 [retrieved on Aug. 16, 2023], 5 pages, Retrieved from the Internet: URL: https://web.archive.org/web/20220508091934/https://en.wikipedia.org/wiki/Multipledocument_interface.

* cited by examiner

VIRTUAL OBJECT STRUCTURES AND INTERRELATIONSHIPS

TECHNICAL FIELD

The present disclosure is directed to the creation and orchestration of virtual objects, on in artificial reality system, defined as a collection of components and with inheritance in an object hierarchy between virtual objects.

BACKGROUND

Interactions with computing systems are often founded on a set of core concepts that define how users can interact with that computing system. For example, early operating systems provided textual interfaces to interact with a file directory. This was later built upon with the addition of "windowing" systems, whereby levels in the file directory and executing applications were displayed in multiple windows, each allocated a portion of a 2D display that was populated with content selected for that window (e.g., all the files from the same level in the directory, a graphical user interface generated by an application, menus or controls for the operating system, etc.). As computing form factors decreased in size and added integrated hardware capabilities (e.g., cameras, GPS, wireless antennas, etc.) the core concepts again evolved, moving to an "app" focus where each app encapsulated a capability of the computing system. New artificial reality systems have provided opportunities for further object and interaction models.

Existing artificial reality systems provide virtual objects, such as 3D virtual objects and 2D panels, with which a user can interact in 3D space. Existing artificial reality systems have generally backed these virtual objects by extending the app core computing concept. For example, a user can instantiate these models by activating an app and telling the app to create the model, and using the model as an interface back to the app. Such existing artificial reality systems are highly unintuitive, inflexible, and difficult to create content for. For example, existing artificial reality systems typically limit virtual objects to be used by the app that created them, require each user to learn how to use the virtual objects crated by each app, and make virtual object development labor intensive and prone to error.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
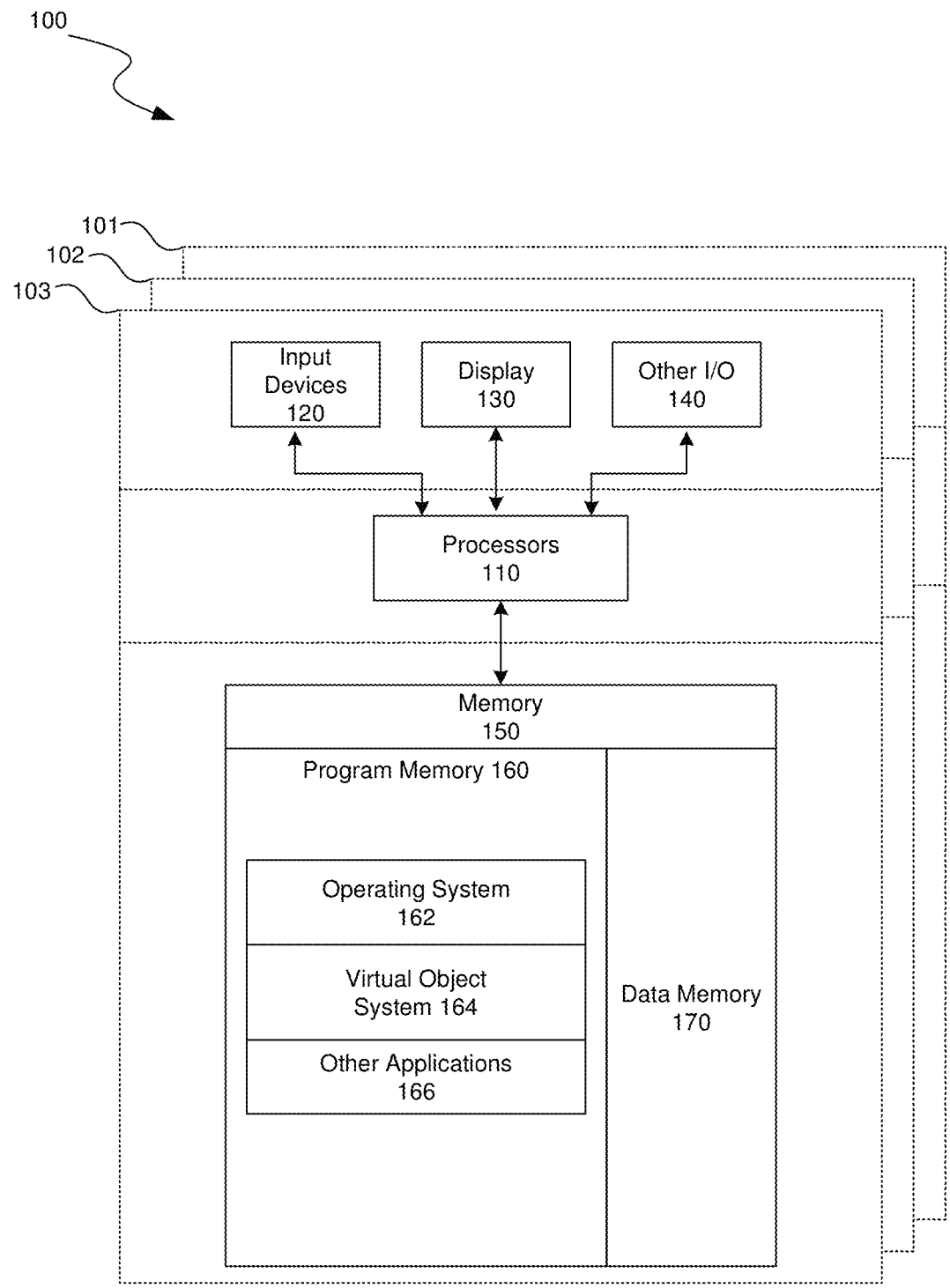
FIG. 1 is a block diagram illustrating an overview of devices on which some implementations of the present technology can operate.

Aspects of the present disclosure are directed to a virtual object system for creating an orchestrating virtual objects in an artificial reality environment. The virtual object system defines how content can be written into a volume in an artificial reality environment, rules for showing that content with various contexts, and connections and links between virtual objects. For example, virtual objects created and orchestrated in the virtual object system can have a common structure of components including a container, data, a template, and a controller. Such a virtual object system benefits both virtual object creators and end-users by systematizing the design patterns of virtual objects, so that they'll be consistent across virtual object sources. This can make virtual object use more intuitive with expected behaviors, virtual object design faster and easier with reusable content, and virtual object functionality more flexible and dynamic with the ability to inherit features from other objects in a hierarchy.

A virtual object's container can define the volume the virtual object is authorized to write into. In some cases, the container can be a set of nested containers, e.g., an outer container for the entire virtual object which can include A) a data container to hold the display elements of the virtual object (selected and organized according to a current view state as discussed below) and B) zero or more chrome containers to hold UI elements associated with the virtual object. In some implementations, a virtual object's container is provided by a controlling application (e.g., operating system, shell, or other application in control of the artificial reality environment) to an application requesting to create a virtual object. The application can submit a manifest to the controlling application defining details of the container needed and can receive back a handle to the container having been assigned permissions to write, by way of the handle, into the volume that the container occupies. Additional details on containers (also referred to as augments) are provided in U.S. patent application Ser. No. 17/008,478, filed on Aug. 31, 2020, titled "ARTIFICIAL REALITY AUGMENTS AND SURFACES," which is hereby incorporated by reference in its entirety.

A virtual object's data can specify features of the virtual object such as visual elements, parameters, links to external data, meta-data, etc. In some cases, the virtual object's data can be stored as a link to a live data source, allowing the virtual object to present dynamic data (e.g., updated as the data in the live data source is updated). For example, a person virtual object may show an avatar of the person and have a mood data item, specified in a cloud service of a social media platform, controlling an expression worn by the avatar. As the mood data item is set according to user input, such as a post to the social media platform defining the user's mood, the virtual object can be updated with the current value for the mood data item and accordingly set the avatar's expression. While there is an infinite variety of possible data and data types a virtual object can have, types of virtual object can specify required data that must be supplied to a constructor when creating the virtual object. For example, a person virtual object may require a name, an avatar, a status, etc. In some cases, various of the virtual object data items can be inherited from a parent object (e.g., an object from which the virtual object is defined as an extension, as discussed below in relation to a virtual object hierarchy). In some cases, virtual object data can be retrieved from a specified source based on a controlling identifier. For example, a social media post virtual object can be defined to have a number of visual elements, parameters, etc., but the post virtual object can be defined by supplying a social media platform and an ID for the post. Upon instantiation of the post virtual object, an artificial reality device can retrieve the virtual object's data elements by querying the specified social media platform for the needed data elements that are associated with the defined post ID.

The template component can define multiple view states of the virtual object and contextual breakpoint rules for transitioning between them. Each view state can control what and how the virtual object presents data (e.g., visual elements, auditory output, effects) and what the virtual object can use as an anchor point while in that state (e.g., horizontal surfaces, vertical surfaces, points floating in space, etc.) In some cases, the template can be defined as a state machine with each view state being a state of the state machine and the contextual breakpoints defining, for each state, the conditions for transitioning to another state. In various implementations, a template can be defined for a particular virtual object, can be a reusable template defined for a category of virtual object and selected for the particular virtual object, or can be inherited from a parent virtual object in the hierarchy (as discussed below).

The controller component can define logic for the virtual object to respond to input (e.g., user actions, world state/context, and outputs from system services/applications, etc.) For example, the controller can define virtual object rules for object behaviors, spatial behaviors, component management, data management, social actions, notification actions, privacy actions, system actions, etc. In some cases, the controller can define which services the virtual object hooks up to and how the virtual object responds to events from those services. For example, the controller of a person virtual object may define how the virtual object connects to a messaging service and how the person virtual object can display an associated conversation virtual object (which, for example, may be a compound element of the person virtual object or a separate virtual object) upon receiving a new message in that conversation from the messaging service. The controller can also include definitions for how objects plug into each other (e.g., a controller of a first person virtual object can define a connection to a second person virtual object based on a social graph indicating the user associated with the first person virtual object and the user associated with the second person virtual object are defined as "friends.") The controller can specify both internal logic for the virtual object and how the virtual object will operate in different environments and through the controller, the virtual object can be hooked into multiple network enabled services—e.g., social media platforms, news sources, weather sources, internet of things/smart home data, connections to local devices, messaging/calling services, mapping services, shopping services, transportation services, financial services, gaming systems, media providers, calendar services, storage providers, security services, etc. The rules specified by the controller may depend on the current view state of the virtual object. The rules specified by the controller may also depend on any number of other factors such as which other people or objects are in the vicinity, how the virtual object is grouped with or linked to other objects, a state associated with the current user, etc. Some of the virtual object behaviors provided by the controller can be inherited from a parent virtual object in the hierarchy (as discussed below). For example, a base virtual object (or "root" object) in the hierarch can define some behaviors such as being able to peel an object out of a group or how the object reacts when dropped onto another object of a particular type. All the virtual objects in the hierarchy can descend, though one or more levels of inheritance, from the base virtual object and another virtual object that descends from the base virtual object can inherit some behaviors, except for any of these behaviors that are excluded or overwritten in the definition of the virtual object. Some virtual object behaviors that can be defined and inherited are described in U.S. patent application Ser. No. 17/131,563, filed on Dec. 22, 2020, titled "AUGMENT ORCHESTRATION IN AN ARTIFICIAL REALITY ENVIRONMENT," which is hereby incorporated by reference in its entirety. By defining each object to have a controller with its own rules, each object is self-contained to only use its own resources (i.e., the resources in scope to the virtual object).

Each virtual object instantiated in an artificial reality environment can be part of an object hierarchy. The definition of each object can specify which other object in the hierarchy that object extends, where extending an object includes inheriting that object's components (container definition or "manifest," data, template, and controller), which can be modified or overwritten as part of the extension. For example, the hierarchy can include a base object as a root node that provides low-level services to all extending objects. In some cases, the base object can specify fields such as a name, ID, an owner/author of the object, a set of attachable UIs, a notification interface, a default template with contextual breakpoints (e.g., for vertical, horizontal, and floating view states), interfaces with a social media social graph, position configurations (e.g., world locked, body locked, device locked, etc.), data management resources, social media actions (e.g., share, send, post, etc.), object management actions (e.g., open/close, add to object grouping, save to collection, etc.), privacy actions, among others. In some implementations, a set of native objects (e.g., person, place, photo, post, event, page, and/or conversation) each extends the base object and can be further extended by applications to create application versions of these native objects ("app objects"). In some cases, a special purpose object (e.g., with a container and UIs for particular effects) extend the base object, with further special objects (e.g., clock, confetti, weather app, timer, etc.) further extending this special purpose object and inheriting its container and UI elements. Yet further in some cases, a custom object can extend the base object, with any custom modification to the base object and further custom objects can extend this custom object, inheriting its components.

To define a virtual object, the artificial reality system can receive a designation of which object in the hierarchy the new virtual object will extend—specifying an initial set of components for the new virtual object. The virtual object system can then receive designations of additional or alternate components to use for this virtual object. This can include defining the object's parameters (i.e., a manifest) for requesting a container; the object's data (e.g., visual elements, state, meta-data, attachable UIs, other objects used inside this object, etc.); features of the object's controller (e.g., rules defining how the object interacts with external elements—such as other objects/services/network data, etc.—and user input), and aspects of a template for the object (e.g., a set of view states with contextual breakpoints). In each case, the virtual object definition process can add to the inherited components, remove aspects of the inherited components, or replace the inherited components with alternate ones. In some cases, the template selected for the virtual object can be from a set of reusable templates, which can be defined by specifying one or more view states, defining contextual breakpoints among the view states, and saving the template as a reusable prefab that can be selected for the definition of multiple virtual objects.

Embodiments of the disclosed technology may include or be implemented in conjunction with an artificial reality system. Artificial reality or extra reality (XR) is a form of reality that has been adjusted in some manner before presentation to a user, which may include, e.g., virtual reality (VR), augmented reality (AR), mixed reality (MR), hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, a "cave" environment or other projection system, or any other hardware platform capable of providing artificial reality content to one or more viewers.

"Virtual reality" or "VR," as used herein, refers to an immersive experience where a user's visual input is controlled by a computing system. "Augmented reality" or "AR" refers to systems where a user views images of the real world after they have passed through a computing system. For example, a tablet with a camera on the back can capture images of the real world and then display the images on the screen on the opposite side of the tablet from the camera. The tablet can process and adjust or "augment" the images as they pass through the system, such as by adding virtual objects. "Mixed reality" or "MR" refers to systems where light entering a user's eye is partially generated by a computing system and partially composes light reflected off objects in the real world. For example, a MR headset could be shaped as a pair of glasses with a pass-through display, which allows light from the real world to pass through a waveguide that simultaneously emits light from a projector in the MR headset, allowing the MR headset to present virtual objects intermixed with the real objects the user can see. "Artificial reality," "extra reality," or "XR," as used herein, refers to any of VR, AR, MR, or any combination or hybrid thereof.

In existing artificial reality systems, virtual object are typically segregated within their originating application. While, in some cases, the ownership of the virtual object can be moved between applications, this typically requires advanced coordination between the applications so they each can know what features the virtual object has and how to interact with it. Thus, the process of moving virtual objects between applications generates friction and can break functionality or be impossible between some applications. Further, each application being in charge of how its virtual objects react to input, what user interfaces it has, and how it hooks into system services makes existing artificial reality systems unintuitive, requiring users learn the interaction patterns provided by each application. Yet further, existing artificial reality systems generally require application developers to build their virtual objects from scratch. While they may provide some modules or editors, they fail to allow a virtual object created by one application to incorporate or extend virtual objects created by another application.

The virtual object system and methods described herein are expected to overcome these failing in existing artificial reality systems, providing an architecture that is more intuitive, consistent, scalable, data-centric, and social. The virtual object system makes virtual objects more intuitive as most objects will share some base behaviors inherited from the base object in an object hierarchy, while objects representing real-world entities can inherit features of those entities from pre-defined versions. This enables the virtual objects to easily mimic behaviors of the people, places, and things from the real world, as well as taking on behaviors to effectively function in an artificial reality environment. Virtual objects that inherit or extend data, capabilities, behaviors and views from each other in the hierarchy enhances reusability, reduces data redundancy, standardizes object design patterns, and provides a foundation for data security. Further, the virtual object system makes virtual objects more consistent through each object inheriting capabilities, data, behaviors, and views from its parent in the object hierarchy. Users become familiar with these elements provided by the base object and through the elements provided by type-specific native virtual objects, resulting in a consistent user experiences with developers only having to pick an appropriate place in the hierarchy for these inheritances. By providing an object hierarchy the virtual object system standardizes the way objects are built and represented, making it easier for users and developers to build a consistent mental model of construction, interaction, and representation with virtual objects. In addition, the consistent virtual object design and inheritances provided by the virtual object system allows virtual objects to not be tied to a particular application, so the virtual objects can move between contexts and objects from different sources can be used together or within each other. The virtual object system can also provide a scalable development platform, with objects having consistent structures allowing them to be combined to create more complex objects, or be broken down with their components forming reusable prefabs for other virtual objects. In addition, the virtual object system can provide virtual objects that are data-centric with objects, through their inheritances, automatically linked into data sources such as a social graph, data storage provider, media providers, etc., and automatically supporting data-centric capabilities such as social media activities, tracked user actions, event attendance, shopping services, banking, etc. For example, various virtual objects can each represent an element on a social graph (as described below), automatically connecting the virtual object to other nodes through the edges in the social graph.

Several implementations are discussed below in more detail in reference to the figures. FIG. 1 is a block diagram illustrating an overview of devices on which some implementations of the disclosed technology can operate. The devices can comprise hardware components of a computing system 100 that facilitates the creation and orchestration of virtual objects, on an artificial reality device, defined as a collection of components and with inheritance between virtual objects in an object hierarchy. In various implementations, computing system 100 can include a single computing device 103 or multiple computing devices (e.g., computing device 101, computing device 102, and computing device 103) that communicate over wired or wireless channels to distribute processing and share input data. In some implementations, computing system 100 can include a stand-alone headset capable of providing a computer created or augmented experience for a user without the need for external processing or sensors. In other implementations, computing system 100 can include multiple computing devices such as a headset and a core processing component (such as a console, mobile device, or server system) where some processing operations are performed on the headset and others are offloaded to the core processing component. Example headsets are described below in relation to FIGS. 2A and 2B. In some implementations, position and environment data can be gathered only by sensors incorporated in the headset device, while in other implementations one or more of the non-headset computing devices can include sensor components that can track environment or position data.

Computing system 100 can include one or more processor(s) 110 (e.g., central processing units (CPUs), graphical processing units (GPUs), holographic processing units (HPUs), etc.) Processors 110 can be a single processing unit or multiple processing units in a device or distributed across multiple devices (e.g., distributed across two or more of computing devices 101-103).

Computing system 100 can include one or more input devices 120 that provide input to the processors 110, notifying them of actions. The actions can be mediated by a hardware controller that interprets the signals received from the input device and communicates the information to the processors 110 using a communication protocol. Each input device 120 can include, for example, a mouse, a keyboard, a touchscreen, a touchpad, a wearable input device (e.g., a haptics glove, a bracelet, a ring, an earring, a necklace, a watch, etc.), a camera (or other light-based input device, e.g., an infrared sensor), a microphone, or other user input devices.

Processors 110 can be coupled to other hardware devices, for example, with the use of an internal or external bus, such as a PCI bus, SCSI bus, or wireless connection. The processors 110 can communicate with a hardware controller for devices, such as for a display 130. Display 130 can be used to display text and graphics. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network chip or card, video chip or card, audio chip or card, USB, firewire or other external device, camera, printer, speakers, CD-ROM drive, DVD drive, disk drive, etc.

In some implementations, input from the I/O devices 140, such as cameras, depth sensors, IMU sensor, GPS units, LiDAR or other time-of-flights sensors, etc. can be used by the computing system 100 to identify and map the physical environment of the user while tracking the user's location within that environment. This simultaneous localization and mapping (SLAM) system can generate maps (e.g., topologies, girds, etc.) for an area (which may be a room, building, outdoor space, etc.) and/or obtain maps previously generated by computing system 100 or another computing system that had mapped the area. The SLAM system can track the user within the area based on factors such as GPS data, matching identified objects and structures to mapped objects and structures, monitoring acceleration and other position changes, etc.

Computing system 100 can include a communication device capable of communicating wirelessly or wire-based with other local computing devices or a network node. The communication device can communicate with another device or a server through a network using, for example, TCP/IP protocols. Computing system 100 can utilize the communication device to distribute operations across multiple network devices.

The processors 110 can have access to a memory 150, which can be contained on one of the computing devices of computing system 100 or can be distributed across of the multiple computing devices of computing system 100 or other external devices. A memory includes one or more hardware devices for volatile or non-volatile storage, and can include both read-only and writable memory. For example, a memory can include one or more of random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, virtual object system 164, and other application programs 166. Memory 150 can also include data memory 170 that can include virtual object components (e.g., containers, data, templates, controllers), virtual object hierarchies, configuration data, settings, user options or preferences, etc., which can be provided to the program memory 160 or any element of the computing system 100.

Some implementations can be operational with numerous other computing system environments or configurations. Examples of computing systems, environments, and/or configurations that may be suitable for use with the technology include, but are not limited to, XR headsets, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2A:
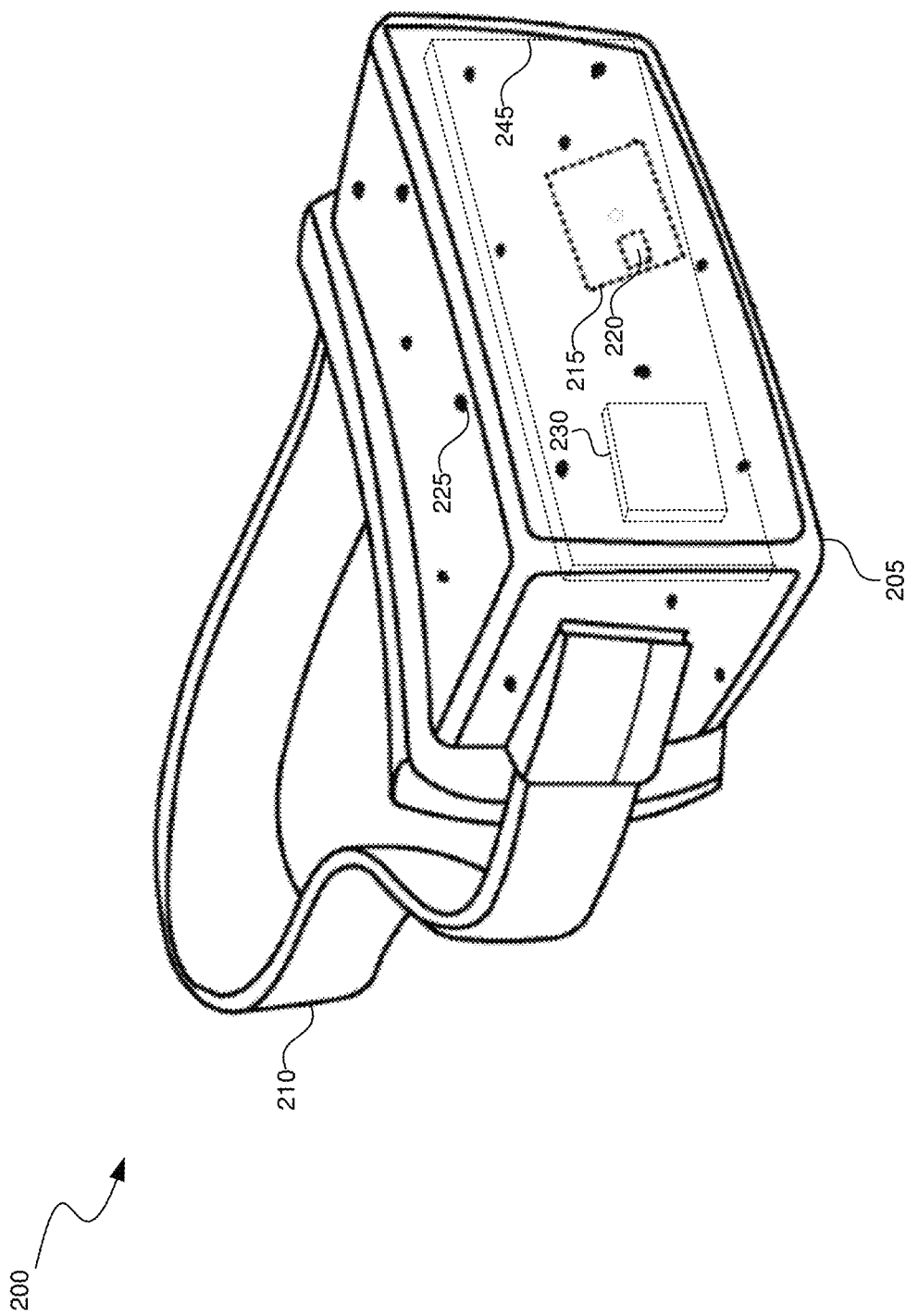
FIG. 2A is a wire diagram illustrating a virtual reality headset which can be used in some implementations of the present technology.

FIG. 2A is a wire diagram of a virtual reality head-mounted display (HMD) 200, in accordance with some embodiments. The HMD 200 includes a front rigid body 205 and a band 210. The front rigid body 205 includes one or more electronic display elements of an electronic display 245, an inertial motion unit (IMU) 215, one or more position sensors 220, locators 225, and one or more compute units 230. The position sensors 220, the IMU 215, and compute units 230 may be internal to the HMD 200 and may not be visible to the user. In various implementations, the IMU 215, position sensors 220, and locators 225 can track movement and location of the HMD 200 in the real world and in an artificial reality environment in three degrees of freedom (3DoF) or six degrees of freedom (6DoF). For example, the locators 225 can emit infrared light beams which create light points on real objects around the HMD 200. As another example, the IMU 215 can include e.g., one or more accelerometers, gyroscopes, magnetometers, other non-camera-based position, force, or orientation sensors, or combinations thereof. One or more cameras (not shown) integrated with the HMD 200 can detect the light points. Compute units 230 in the HMD 200 can use the detected light points to extrapolate position and movement of the HMD 200 as well as to identify the shape and position of the real objects surrounding the HMD 200.

The electronic display 245 can be integrated with the front rigid body 205 and can provide image light to a user as dictated by the compute units 230. In various embodiments, the electronic display 245 can be a single electronic display or multiple electronic displays (e.g., a display for each user eye). Examples of the electronic display 245 include: a liquid crystal display (LCD), an organic light-emitting diode (OLED) display, an active-matrix organic light-emitting diode display (AMOLED), a display including one or more quantum dot light-emitting diode (QOLED) sub-pixels, a projector unit (e.g., microLED, LASER, etc.), some other display, or some combination thereof.

In some implementations, the HMD 200 can be coupled to a core processing component such as a personal computer (PC) (not shown) and/or one or more external sensors (not shown). The external sensors can monitor the HMD 200 (e.g., via light emitted from the HMD 200) which the PC can use, in combination with output from the IMU 215 and position sensors 220, to determine the location and movement of the HMD 200.

Figure 2B:
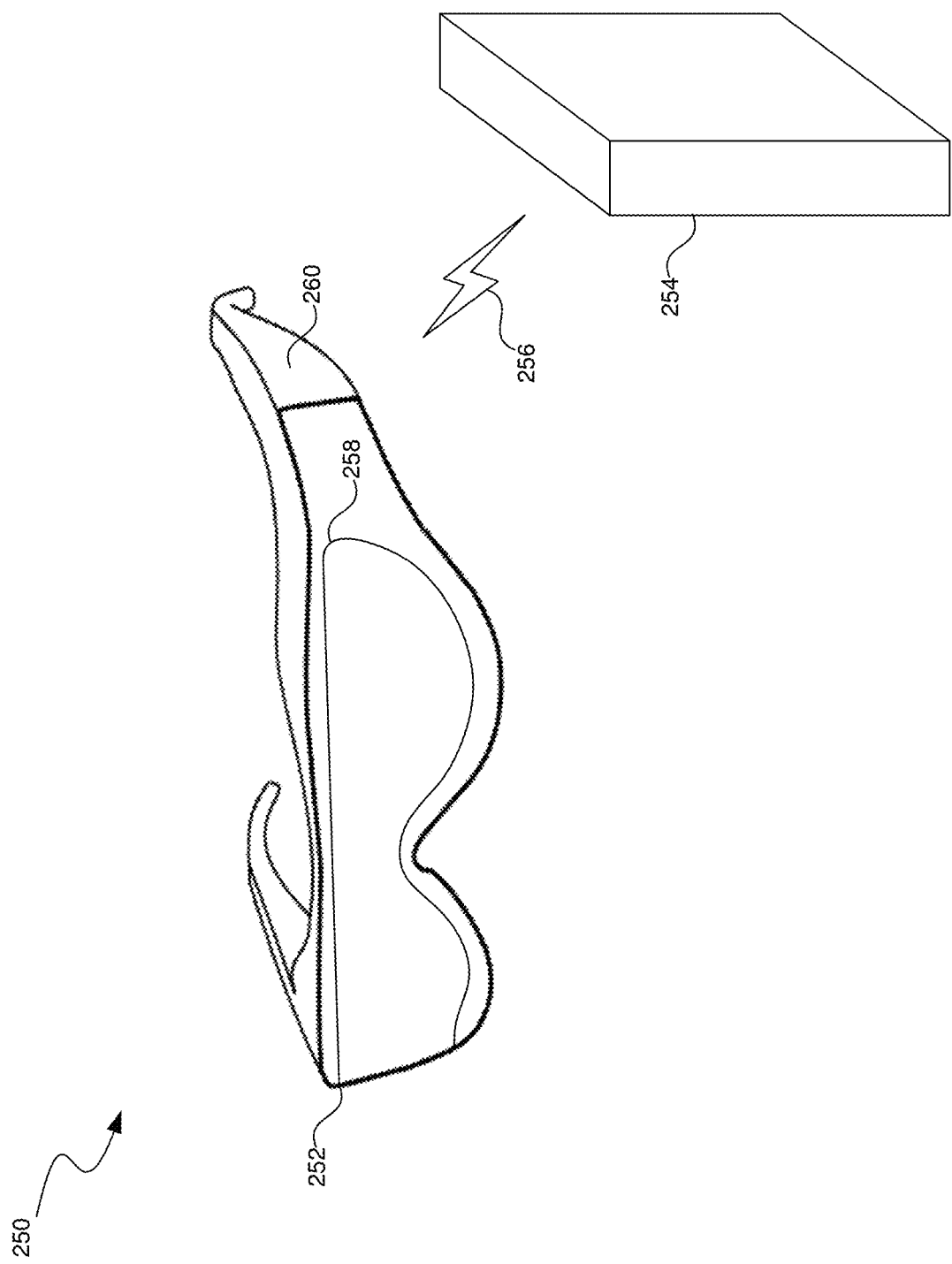
FIG. 2B is a wire diagram illustrating a mixed reality headset which can be used in some implementations of the present technology.

FIG. 2B is a wire diagram of a mixed reality HMD system 250 which includes a mixed reality HMD 252 and a core processing component 254. The mixed reality HMD 252 and the core processing component 254 can communicate via a wireless connection (e.g., a 60 GHz link) as indicated by link 256. In other implementations, the mixed reality system 250 includes a headset only, without an external compute device or includes other wired or wireless connections between the mixed reality HMD 252 and the core processing component 254. The mixed reality HMD 252 includes a pass-through display 258 and a frame 260. The frame 260 can house various electronic components (not shown) such as light projectors (e.g., LASERs, LEDs, etc.), cameras, eye-tracking sensors, MEMS components, networking components, etc.

The projectors can be coupled to the pass-through display 258, e.g., via optical elements, to display media to a user. The optical elements can include one or more waveguide assemblies, reflectors, lenses, mirrors, collimators, gratings, etc., for directing light from the projectors to a user's eye. Image data can be transmitted from the core processing component 254 via link 256 to HMD 252. Controllers in the HMD 252 can convert the image data into light pulses from the projectors, which can be transmitted via the optical elements as output light to the user's eye. The output light can mix with light that passes through the display 258, allowing the output light to present virtual objects that appear as if they exist in the real world.

Similarly to the HMD 200, the HMD system 250 can also include motion and position tracking units, cameras, light sources, etc., which allow the HMD system 250 to, e.g., track itself in 3DoF or 6DoF, track portions of the user (e.g., hands, feet, head, or other body parts), map virtual objects to appear as stationary as the HMD 252 moves, and have virtual objects react to gestures and other real-world objects.

Figure 2C:
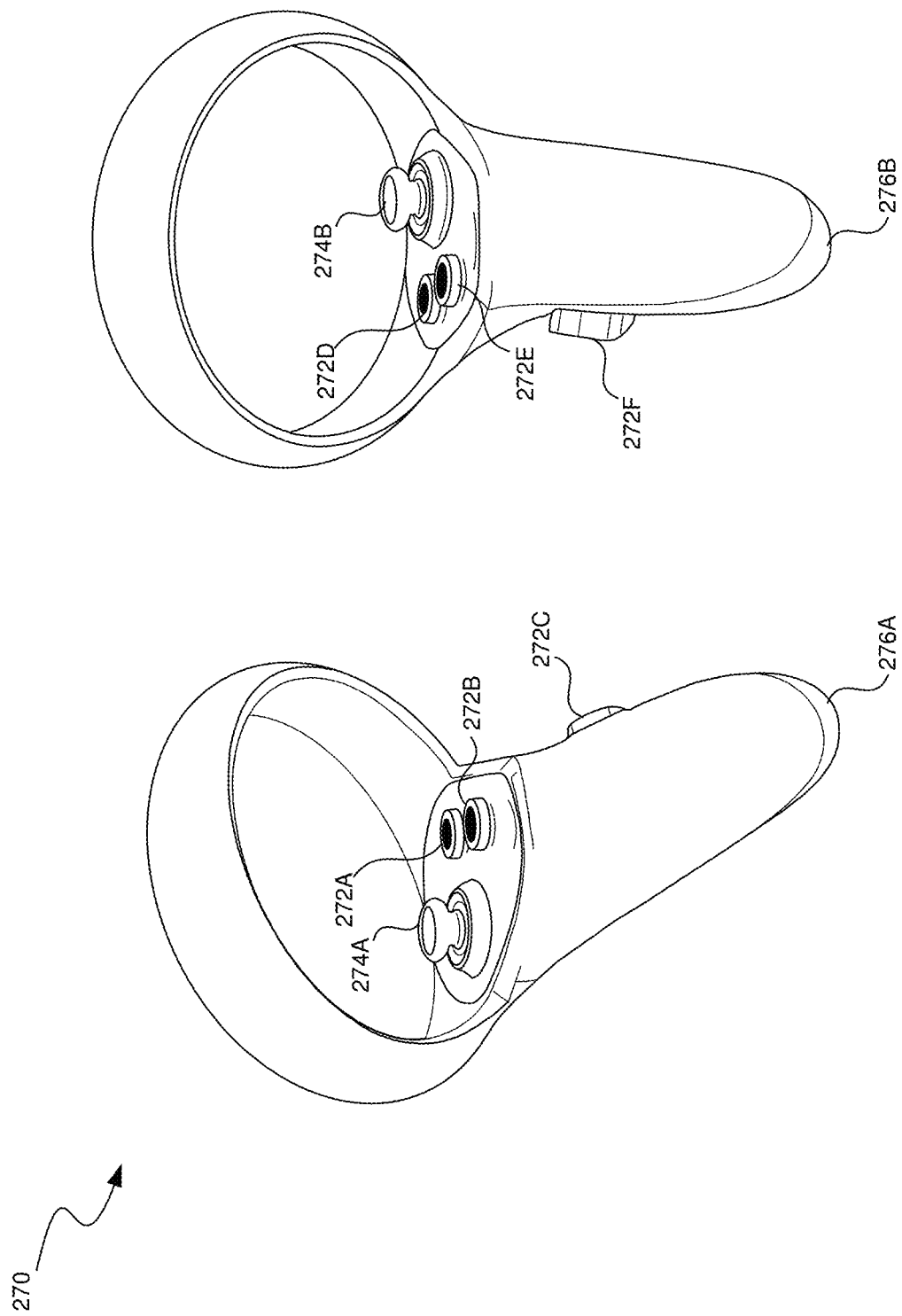
FIG. 2C is a wire diagram illustrating controllers which, in some implementations, a user can hold in one or both hands to interact with an artificial reality environment.

FIG. 2C illustrates controllers 270, which, in some implementations, a user can hold in one or both hands to interact with an artificial reality environment presented by the HMD 200 and/or HMD 250. The controllers 270 can be in communication with the HMDs, either directly or via an external device (e.g., core processing component 254). The controllers can have their own IMU units, position sensors, and/or can emit further light points. The HMD 200 or 250, external sensors, or sensors in the controllers can track these controller light points to determine the controller positions and/or orientations (e.g., to track the controllers in 3DoF or 6DoF). The compute units 230 in the HMD 200 or the core processing component 254 can use this tracking, in combination with IMU and position output, to monitor hand positions and motions of the user. The controllers can also include various buttons (e.g., buttons 272A-F) and/or joysticks (e.g., joysticks 274A-B), which a user can actuate to provide input and interact with objects.

In various implementations, the HMD 200 or 250 can also include additional subsystems, such as an eye tracking unit, an audio system, various network components, etc., to monitor indications of user interactions and intentions. For example, in some implementations, instead of or in addition to controllers, one or more cameras included in the HMD 200 or 250, or from external cameras, can monitor the positions and poses of the user's hands to determine gestures and other hand and body motions. As another example, one or more light sources can illuminate either or both of the user's eyes and the HMD 200 or 250 can use eye-facing cameras to capture a reflection of this light to determine eye position (e.g., based on set of reflections around the user's cornea), modeling the user's eye and determining a gaze direction.

Figure 3:
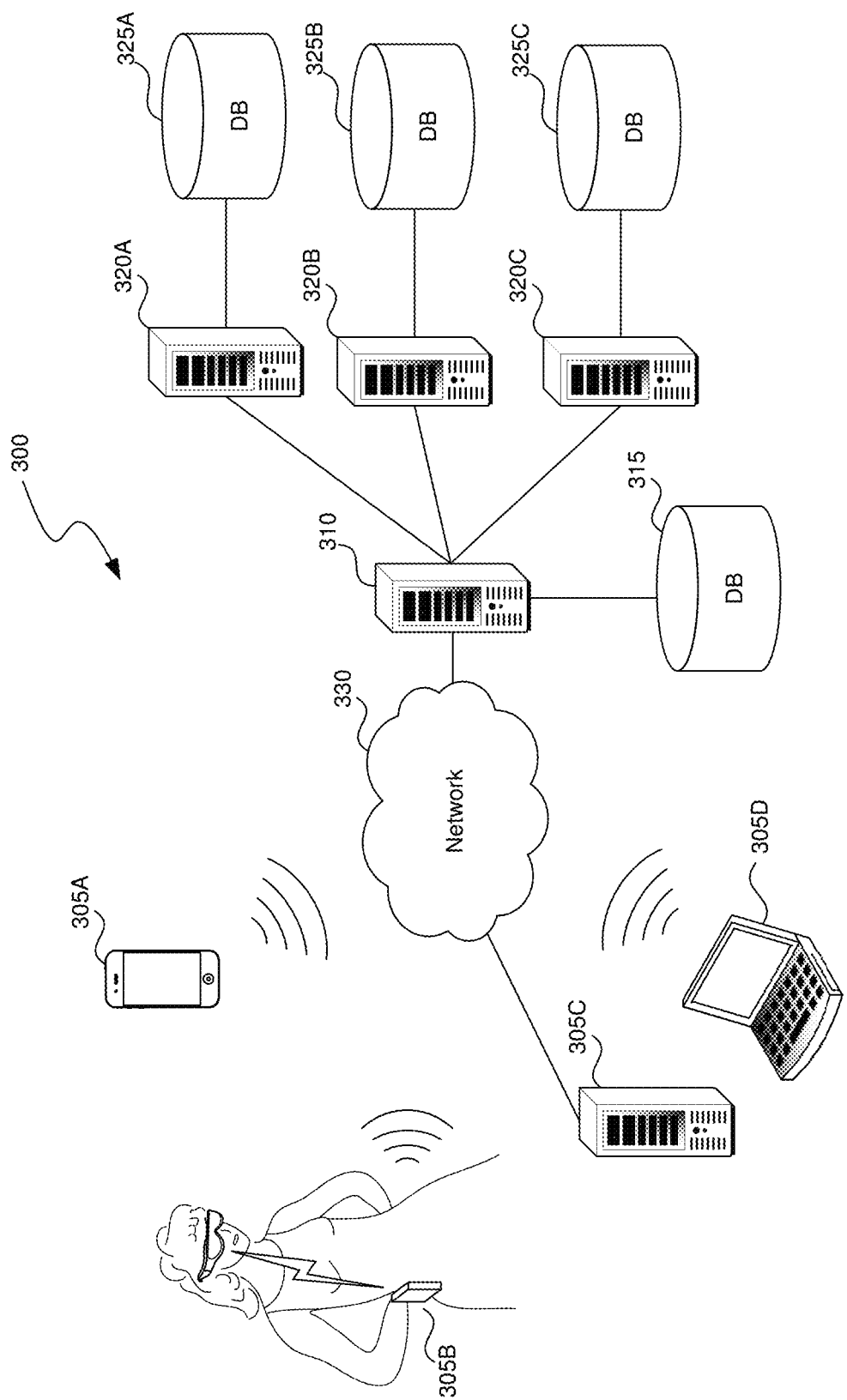
FIG. 3 is a block diagram illustrating an overview of an environment in which some implementations of the present technology can operate.

FIG. 3 is a block diagram illustrating an overview of an environment 300 in which some implementations of the disclosed technology can operate. Environment 300 can include one or more client computing devices 305A-D, examples of which can include computing system 100. In some implementations, some of the client computing devices (e.g., client computing device 305B) can be the HMD 200 or the HMD system 250. Client computing devices 305 can operate in a networked environment using logical connections through network 330 to one or more remote computers, such as a server computing device.

In some implementations, server 310 can be an edge server which receives client requests and coordinates fulfillment of those requests through other servers, such as servers 320A-C. Server computing devices 310 and 320 can comprise computing systems, such as computing system 100. Though each server computing device 310 and 320 is displayed logically as a single server, server computing devices can each be a distributed computing environment encompassing multiple computing devices located at the same or at geographically disparate physical locations.

Client computing devices 305 and server computing devices 310 and 320 can each act as a server or client to other server/client device(s). Server 310 can connect to a database 315. Servers 320A-C can each connect to a corresponding database 325A-C. As discussed above, each server 310 or 320 can correspond to a group of servers, and each of these servers can share a database or can have their own database. Though databases 315 and 325 are displayed logically as single units, databases 315 and 325 can each be a distributed computing environment encompassing multiple computing devices, can be located within their corresponding server, or can be located at the same or at geographically disparate physical locations.

Network 330 can be a local area network (LAN), a wide area network (WAN), a mesh network, a hybrid network, or other wired or wireless networks. Network 330 may be the Internet or some other public or private network. Client computing devices 305 can be connected to network 330 through a network interface, such as by wired or wireless communication. While the connections between server 310 and servers 320 are shown as separate connections, these connections can be any kind of local, wide area, wired, or wireless network, including network 330 or a separate public or private network.

In some implementations, servers 310 and 320 can be used as part of a social network. The social network can maintain a social graph and perform various actions based on the social graph. A social graph can include a set of nodes (representing social networking system objects, also known as social objects) interconnected by edges (representing interactions, activity, or relatedness). A social networking system object can be a social networking system user, nonperson entity, content item, group, social networking system page, location, application, subject, concept representation or other social networking system object, e.g., a movie, a band, a book, etc. Content items can be any digital data such as text, images, audio, video, links, webpages, minutia (e.g., indicia provided from a client device such as emotion indicators, status text snippets, location indictors, etc.), or other multi-media. In various implementations, content items can be social network items or parts of social network items, such as posts, likes, mentions, news items, events, shares, comments, messages, other notifications, etc. Subjects and concepts, in the context of a social graph, comprise nodes that represent any person, place, thing, or idea.

A social networking system can enable a user to enter and display information related to the user's interests, age/date of birth, location (e.g., longitude/latitude, country, region, city, etc.), education information, life stage, relationship status, name, a model of devices typically used, languages identified as ones the user is facile with, occupation, contact information, or other demographic or biographical information in the user's profile. Any such information can be represented, in various implementations, by a node or edge between nodes in the social graph. A social networking system can enable a user to upload or create pictures, videos, documents, songs, or other content items, and can enable a user to create and schedule events. Content items can be represented, in various implementations, by a node or edge between nodes in the social graph.

A social networking system can enable a user to perform uploads or create content items, interact with content items or other users, express an interest or opinion, or perform other actions. A social networking system can provide various means to interact with non-user objects within the social networking system. Actions can be represented, in various implementations, by a node or edge between nodes in the social graph. For example, a user can form or join groups, or become a fan of a page or entity within the social networking system. In addition, a user can create, download, view, upload, link to, tag, edit, or play a social networking system object. A user can interact with social networking system objects outside of the context of the social networking system. For example, an article on a news web site might have a "like" button that users can click. In each of these instances, the interaction between the user and the object can be represented by an edge in the social graph connecting the node of the user to the node of the object. As another example, a user can use location detection functionality (such as a GPS receiver on a mobile device) to "check in" to a particular location, and an edge can connect the user's node with the location's node in the social graph.

A social networking system can provide a variety of communication channels to users. For example, a social networking system can enable a user to email, instant message, or text/SMS message, one or more other users. It can enable a user to post a message to the user's wall or profile or another user's wall or profile. It can enable a user to post a message to a group or a fan page. It can enable a user to comment on an image, wall post or other content item created or uploaded by the user or another user. And it can allow users to interact (via their personalized avatar) with objects or other avatars in an artificial reality environment, etc. In some embodiments, a user can post a status message to the user's profile indicating a current event, state of mind, thought, feeling, activity, or any other present-time relevant communication. A social networking system can enable users to communicate both within, and external to, the social networking system. For example, a first user can send a second user a message within the social networking system, an email through the social networking system, an email external to but originating from the social networking system, an instant message within the social networking system, an instant message external to but originating from the social networking system, provide voice or video messaging between users, or provide an artificial reality environment were users can communicate and interact via avatars or other digital representations of themselves. Further, a first user can comment on the profile page of a second user, or can comment on objects associated with a second user, e.g., content items uploaded by the second user.

Social networking systems enable users to associate themselves and establish connections with other users of the social networking system. When two users (e.g., social graph nodes) explicitly establish a social connection in the social networking system, they become "friends" (or, "connections") within the context of the social networking system. For example, a friend request from a "John Doe" to a "Jane Smith," which is accepted by "Jane Smith," is a social connection. The social connection can be an edge in the social graph. Being friends or being within a threshold number of friend edges on the social graph can allow users access to more information about each other than would otherwise be available to unconnected users. For example, being friends can allow a user to view another user's profile, to see another user's friends, or to view pictures of another user. Likewise, becoming friends within a social networking system can allow a user greater access to communicate with another user, e.g., by email (internal and external to the social networking system), instant message, text message, phone, or any other communicative interface. Being friends can allow a user access to view, comment on, download, endorse or otherwise interact with another user's uploaded content items. Establishing connections, accessing user information, communicating, and interacting within the context of the social networking system can be represented by an edge between the nodes representing two social networking system users.

In addition to explicitly establishing a connection in the social networking system, users with common characteristics can be considered connected (such as a soft or implicit connection) for the purposes of determining social context for use in determining the topic of communications. In some embodiments, users who belong to a common network are considered connected. For example, users who attend a common school, work for a common company, or belong to a common social networking system group can be considered connected. In some embodiments, users with common biographical characteristics are considered connected. For example, the geographic region users were born in or live in, the age of users, the gender of users and the relationship status of users can be used to determine whether users are connected. In some embodiments, users with common interests are considered connected. For example, users' movie preferences, music preferences, political views, religious views, or any other interest can be used to determine whether users are connected. In some embodiments, users who have taken a common action within the social networking system are considered connected. For example, users who endorse or recommend a common object, who comment on a common content item, or who RSVP to a common event can be considered connected. A social networking system can utilize a social graph to determine users who are connected with or are similar to a particular user in order to determine or evaluate the social context between the users. The social networking system can utilize such social context and common attributes to facilitate content distribution systems and content caching systems to predictably select content items for caching in cache appliances associated with specific social network accounts.

Figure 4:
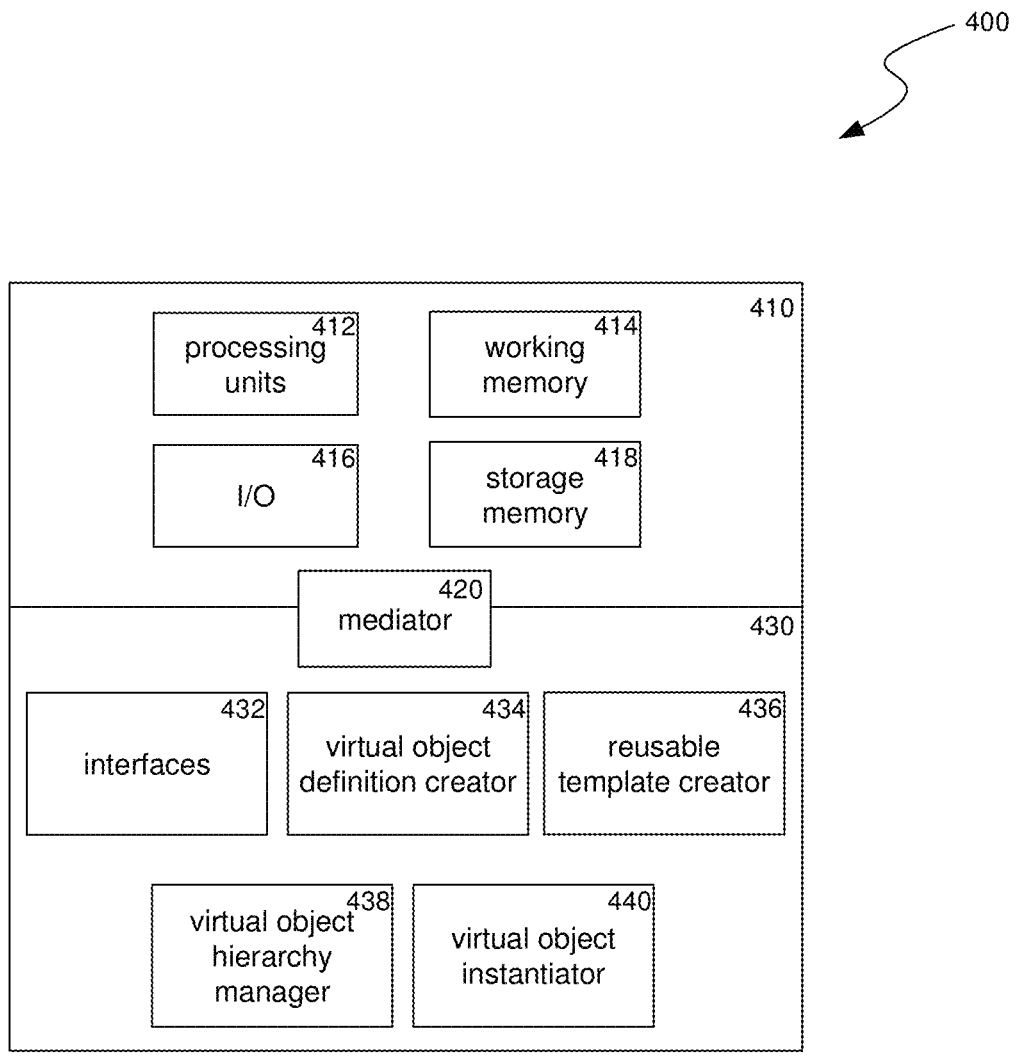
FIG. 4 is a block diagram illustrating components which, in some implementations, can be used in a system employing the disclosed technology.

FIG. 4 is a block diagram illustrating components 400 which, in some implementations, can be used in a system employing the disclosed technology. Components 400 can be included in one device of computing system 100 or can be distributed across multiple of the devices of computing system 100. The components 400 include hardware 410, mediator 420, and specialized components 430. As discussed above, a system implementing the disclosed technology can use various hardware including processing units 412, working memory 414, input and output devices 416 (e.g., cameras, displays, IMU units, network connections, etc.), and storage memory 418. In various implementations, storage memory 418 can be one or more of: local devices, interfaces to remote storage devices, or combinations thereof. For example, storage memory 418 can be one or more hard drives or flash drives accessible through a system bus or can be a cloud storage provider (such as in storage 315 or 325) or other network storage accessible via one or more communications networks. In various implementations, components 400 can be implemented in a client computing device such as client computing devices 305 or on a server computing device, such as server computing device 310 or 320.

Mediator 420 can include components which mediate resources between hardware 410 and specialized components 430. For example, mediator 420 can include an operating system, services, drivers, a basic input output system (BIOS), controller circuits, or other hardware or software systems.

Specialized components 430 can include software or hardware configured to perform operations for the creation and orchestration of virtual objects, defined as a collection of components. Specialized components 430 can include virtual object definition creator 434, reusable template creator 436, virtual object hierarchy manager 438, virtual object instantiator 440, and components and APIs which can be used for providing user interfaces, transferring data, and controlling the specialized components, such as interfaces 432. In some implementations, components 400 can be in a computing system that is distributed across multiple computing devices or can be an interface to a server-based application executing one or more of specialized components 430. Although depicted as separate components, specialized components 430 may be logical or other nonphysical differentiations of functions and/or may be submodules or code-blocks of one or more applications.

Virtual object definition creator 434 can create a definition of a new virtual object by receiving a designation of which object in an object hierarchy, maintained by virtual object hierarchy manager 438, the new virtual object extends, defining additional or alternate components (container, data, controller, and/or template) or component portions for the new virtual object; and connecting data and controller elements to fields of view states defined in the template. Additional details on defining a virtual object are provided below in relation to FIG. 19.

Reusable template creator 436 can define a template that can be used in a virtual object, by virtual object definition creator 434 or stored in a library of prefabricated templates usable by other systems to create virtual objects. Each template can specify a state machine with one or more view states (each defining which and how data elements of a virtual object are displayed while that view state is active for the virtual object) and contextual breakpoints for transitioning between which view state is the active view state. Additional details on defining a reusable template are provided below in relation to FIG. 20.

Virtual object hierarchy manager 438 can manage a hierarchy of virtual object definitions, where each virtual object definition can inherit components from its parent in the hierarchy. A base object definition can specify default features of virtual objects, allowing for virtual objects to be quickly created by developers and have consistent and expected behaviors for users. In some implementations, the hierarchy can specify a set of native object definitions that extend the base object, for common types of virtual objects, such as people, places, events, social media posts, conversations, groups, photos, webpages, etc. In some implementations, a special purpose object definition that extends the base object can define a virtual object for content items which may be commonly used, imported from other platforms, and/or that are user defined. In yet further implementations, a custom virtual object definition that extends the base object can allow developers to create virtual object definitions that inherit some basic content and/or functionality from the base object, allowing them to be used in an artificial reality environment, while providing full flexibility to the developer to define and customize other aspects of the objects. Additional details on object hierarchies are provided below in relation to FIGS. 11 and 12.

Virtual object instantiator 440 can invoke a constructor for a virtual object defined by virtual object definition creator 434, with a set of parameters required by the definition, to instantiate a version of the virtual object in an artificial reality environment. For example, a system can receive an identification of a context of an artificial reality device, such as a state of the artificial reality environment around the artificial reality device, a state of the artificial reality device, a state of the user of the artificial reality device, and/or a state of other factors determined in the world, and use a mapping of some of these contextual factors to virtual objects to determine which virtual object(s) to instantiate. The system can provide the virtual object(s) to the artificial reality device, which can instantiate them by providing the appropriate contextual factors or other parameters (e.g., container, data, template, and/or controller parameters) the constructor needs to instantiate an instance of the virtual object.

Figure 5A:
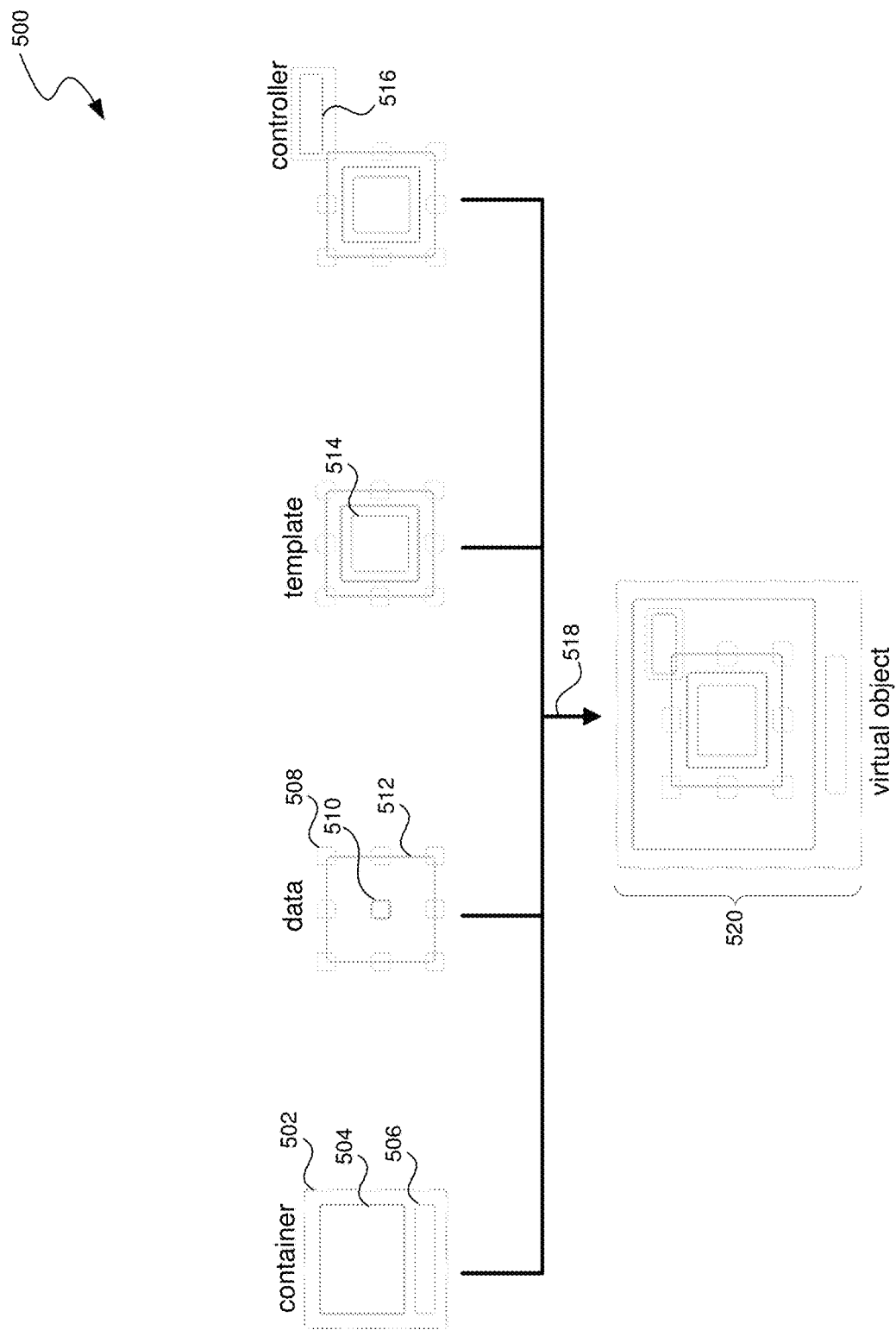
FIGS. 5A and 5B are conceptual diagrams illustrating a breakdown of an object into components.
Figure 5B:
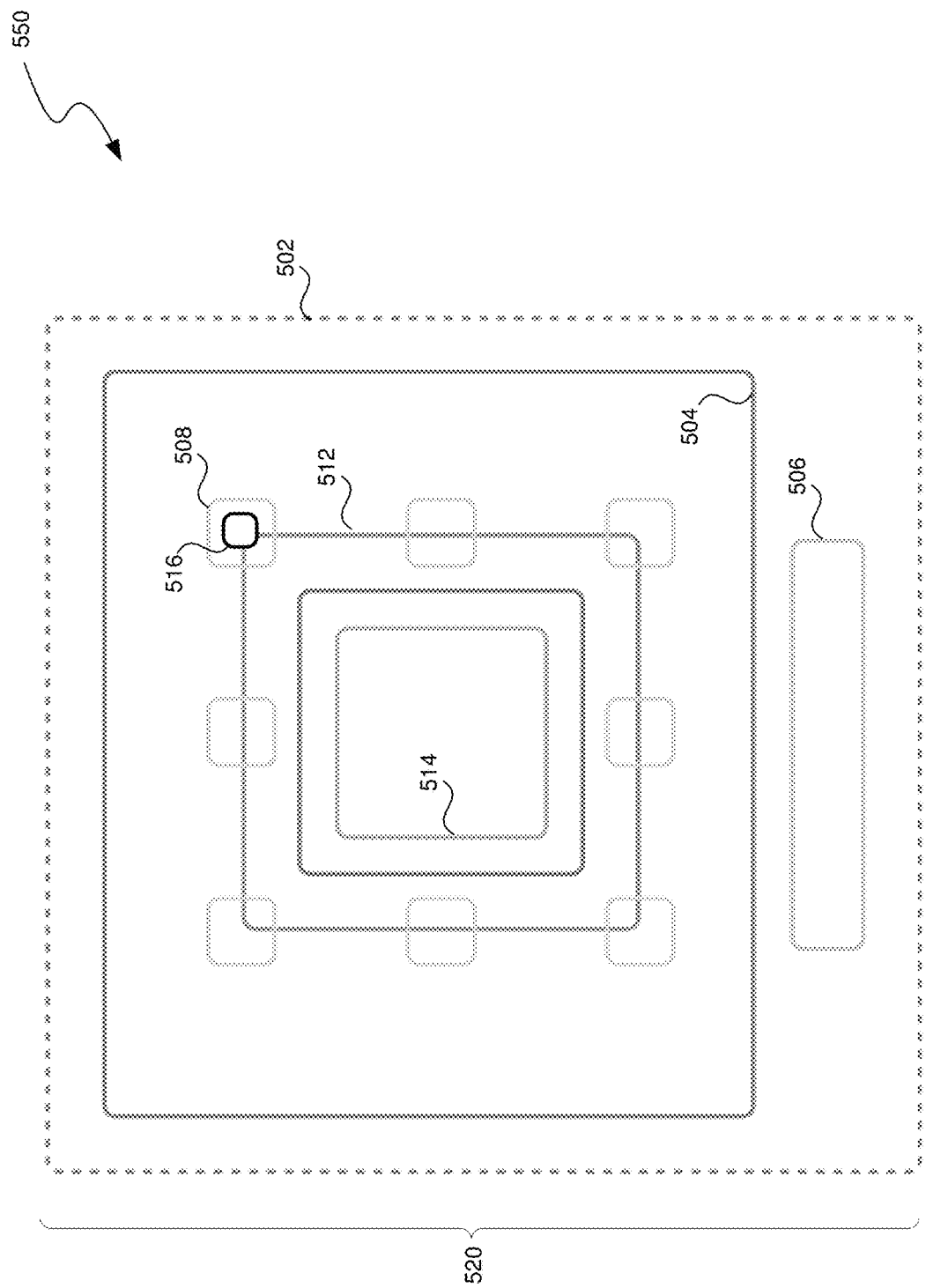

FIGS. 5A and 5B are conceptual diagrams 500 and 550 illustrating a breakdown of an object into components including a container, data, a template, and a controller. The container defines a volume, allocated to the virtual object by an application controlling an artificial reality environment, into which the virtual object can write to provide output. In conceptual diagram 500, the container includes an outer container 502 for the overall virtual object, a first inner container 504 for visual elements of the virtual object, and a second inner container 506 for UI elements of the virtual object. Examples of the data include the displayable (e.g., visual, auditory, haptic, etc.) elements that can be output by the virtual object; state or properties of the virtual object (e.g., configuration, settings, etc.); and meta data of the virtual object (e.g., identifiers, location, name, semantic identifiers, etc.) Additional examples of virtual object data are provided below in relation to FIGS. 13-18. In conceptual diagram 500, the data includes external, dynamic data, such as data 508, that the virtual object accesses, internal data 510 that is local to the virtual object, and relationships among data elements 512. The template 514 includes multiple view states, where each view state defines how the virtual object presents itself when that view state is active. A view state can, e.g., set a configuration of the container, map which data elements of the virtual object are displayed and where they are displayed within the container, which UI elements are shown/hidden, or define other output for the virtual object. The template can act as a state machine where each view state is a state in the state machine and there is contextual breakpoint logic that defines when the virtual object transitions between the view states. A controller 516 can include logic specifying how the virtual object responds to user actions, determined world state/context, input from system services and applications (e.g., communication from network), etc. The portion 516 of the controller illustrated in conceptual diagram 500 illustrates logic of the controller controlling how data element 508 plugs into an external source (e.g., if the virtual object 520 is a person object, controller 516 can define how the person ID 508 is connected to an element in a social graph—linking the person virtual object 520 to other people in the social graph defined as "friends" of the person represented by the virtual object 520).

The components of the virtual object can be combined, as shown by line 518, to create the overall virtual object 520, which is shown in larger view in FIG. 5B. Thus, FIG. 5B illustrates the conceptual design of a virtual object, including a container 502 (with sub-containers 504 and 506) defining a volume for the virtual object data elements, such as data element 508, which are laid out according to an active view state of a template 514, and where actions of the virtual object and connections of the virtual object to external sources are controlled by controller, such as controller portion 516.

Figure 6:
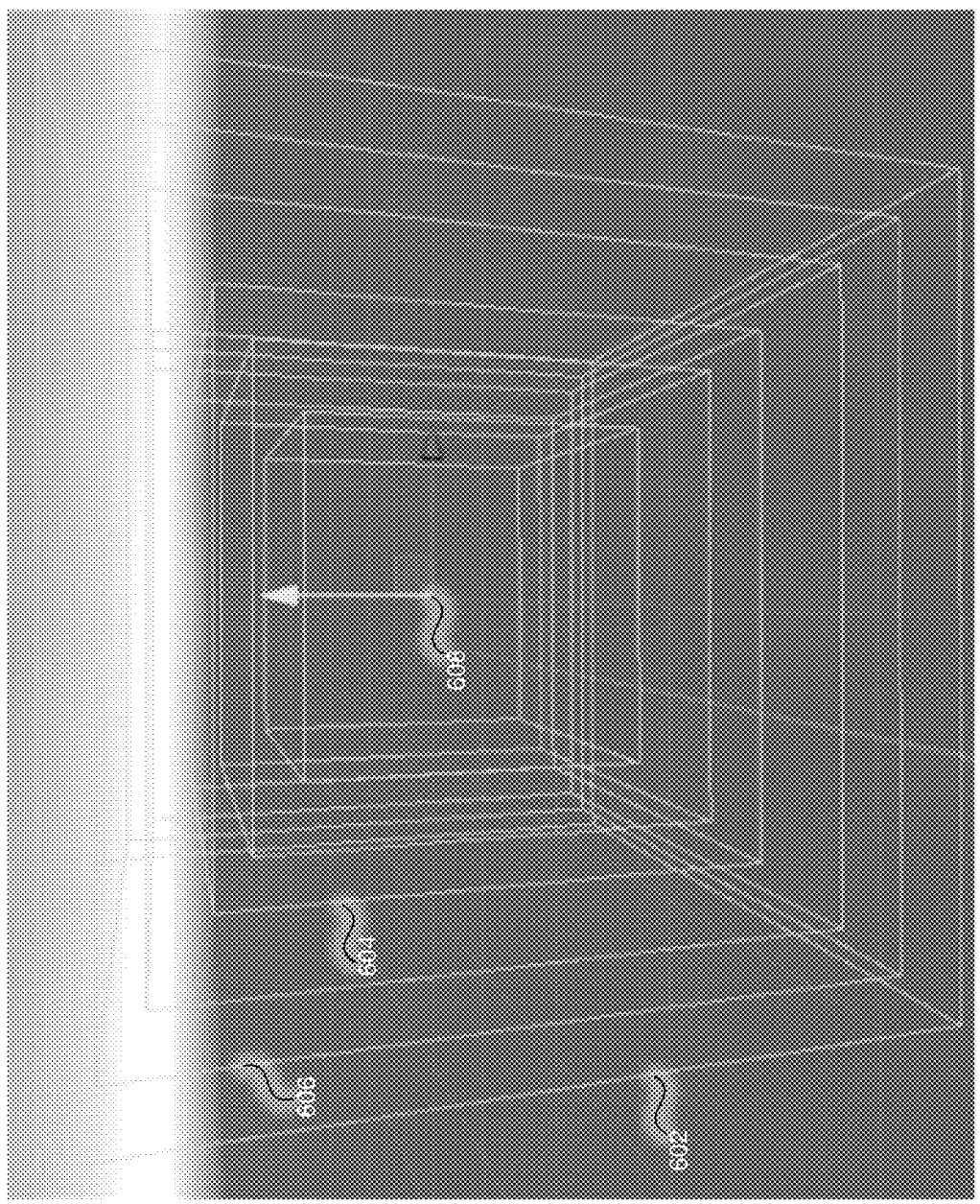
FIG. 6 is a conceptual diagram illustrating an object in 3D space displayed according to a view state from a template.

FIG. 6 is a conceptual diagram 600 illustrating an object in 3D space displayed according to a view state from a template. Other conceptual diagrams illustrated herein use 2D representations of virtual objects and virtual object components for clarity. Conceptual diagram 600 illustrates a 3D artificial reality environment to show that these virtual objects can be made up of 3D elements that exist in the 3D artificial reality environment. In conceptual diagram 600, a virtual object has an outer container 602 defining the overall volume into which the virtual object can write to display its elements. Conceptual diagram 600 also shows bounding boxes 604 and 606 as two possible areas, within the volume 602, that each could be defined by a view state for displaying some of the virtual object's data elements while in that view state. Conceptual diagram 600 further shows an origin point 608, which the view states can use as a point to define positions of data elements within the virtual object.

Figure 7:
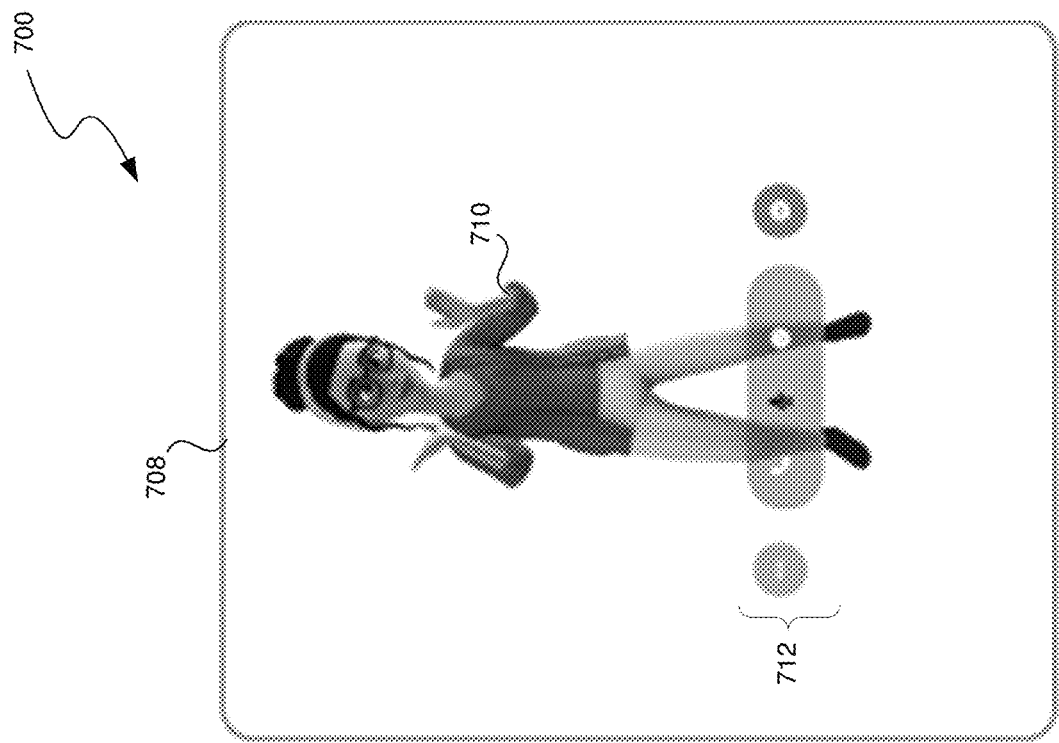
FIG. 7 is a conceptual diagram illustrating a container component of an object and an example implementation of the container component.
Figure 7:
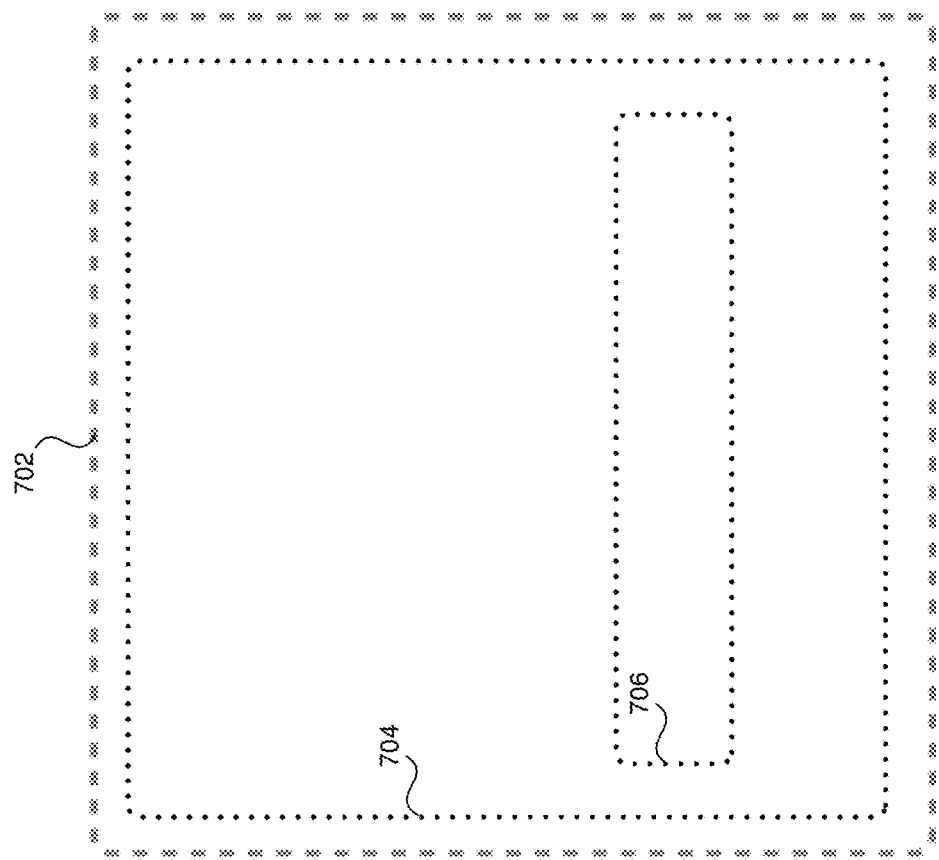

FIG. 7 is a conceptual diagram 700 illustrating a container component of an object and an example implementation of the container component. On the left side of conceptual diagram 700, the container component includes an outer container element 702 defining the entire volume of the virtual object, a first inner container element 704 specifying a portion of the area defined by the outer container element 702 for general content of the virtual object (e.g., visual 2D and 3D models), and a second inner container element 706 specifying a portion of the area defined by the outer container element 702 for UI elements (e.g., a consistent set of elements that enable a user to interact with virtual objects in an expected manner, such as to perform common system actions like Close and Share). On the right side of conceptual diagram 700, an example implementation of the container component, as a person virtual object, is shown where the outer container element 708 is shown (which can be presented to a user in some cases—such as when an object is selected to signify the object's interactive boundary); the first inner container element 710 displays an avatar of the user represented by the virtual object, and the second inner container element 712 shows a standard set of UI elements for interacting with a person virtual object.

Figure 8:
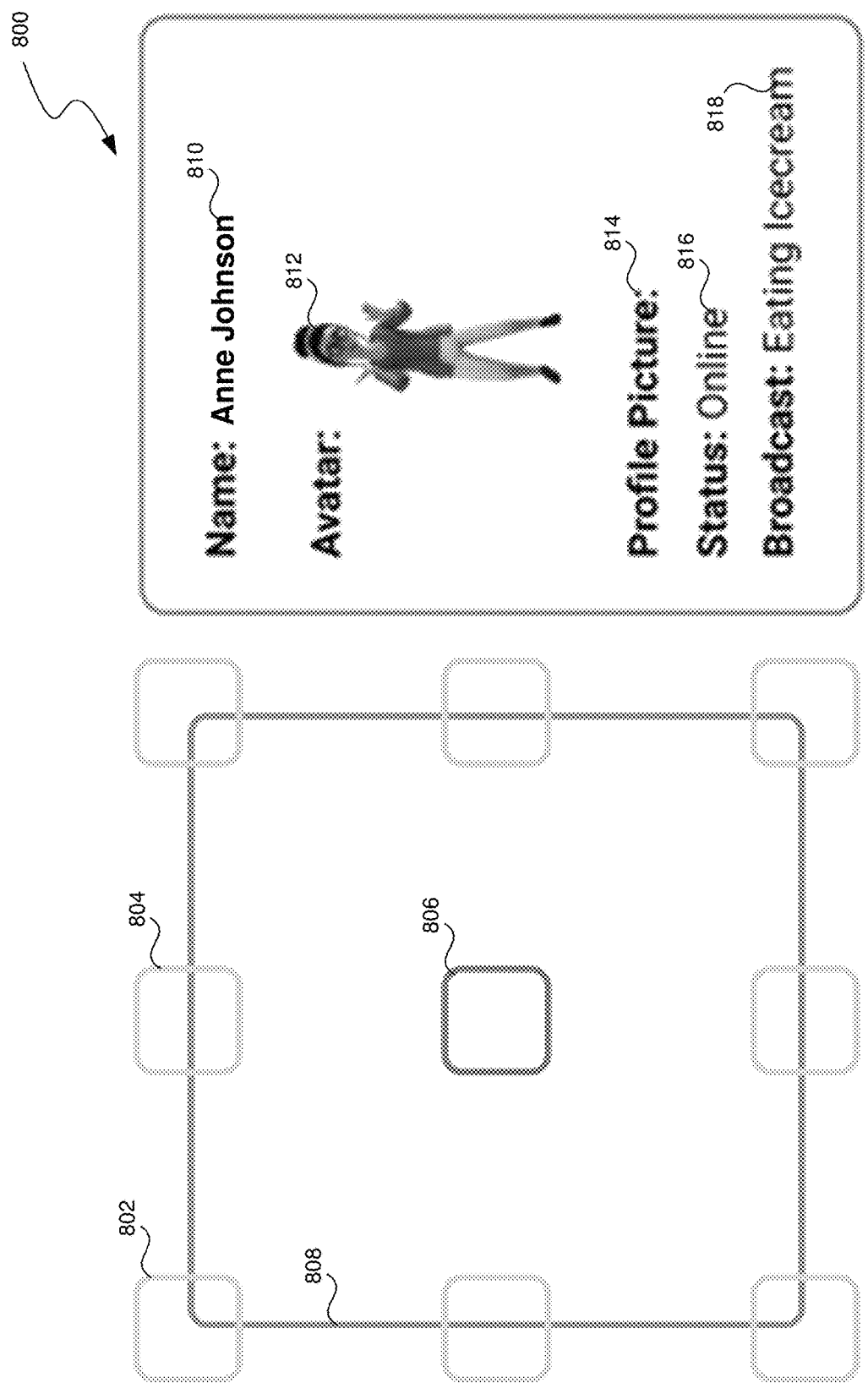
FIG. 8 is a conceptual diagram illustrating a data component of an object and an example implementation of the data component.

FIG. 8 is a conceptual diagram 800 illustrating a data component of an object and an example implementation of the data component. On the left side of conceptual diagram 800, data elements 802-806 are conceptually illustrated. External data elements 802 and 804 are dynamic data elements imported to the data element from external sources such as a social media platform. These data elements can live external to the virtual object, can be periodically updated, or can have updates pushed to them as the external data elements change. For example, data element 802 can be a user's online status 816 as maintained in a first social media platform and data element 804 can be a broadcast message 818, maintained in a second social media platform, that a user has selected to display when her avatar appears in another's artificial reality environment. These data elements can be updated as the user's status or broadcast message changes on the various social media platforms. The virtual object can also have internal data elements, such as data elements 806, which may be set only a single time and/or may not link to any external source. For example, a person virtual object may have a name 810 which exists locally to the virtual object and is only set when the person virtual object is first created and may have an avatar 812, which is copied to the virtual object and exists locally, only being updated when the user updates the avatar through the virtual object. The data for a virtual object may have fields that link to an external source, but are not set in that source and thus remain empty. For example, the user corresponding to a person virtual object may not have set a profile picture on a social media platform, and thus the profile picture 814 data element may be empty. In some cases, the virtual object can define interactions or relationships among its data elements, shown as link 808. For example, a person virtual object could define set of user IDs that each specify the corresponding user profile on a corresponding social media platform.

Figure 9A:
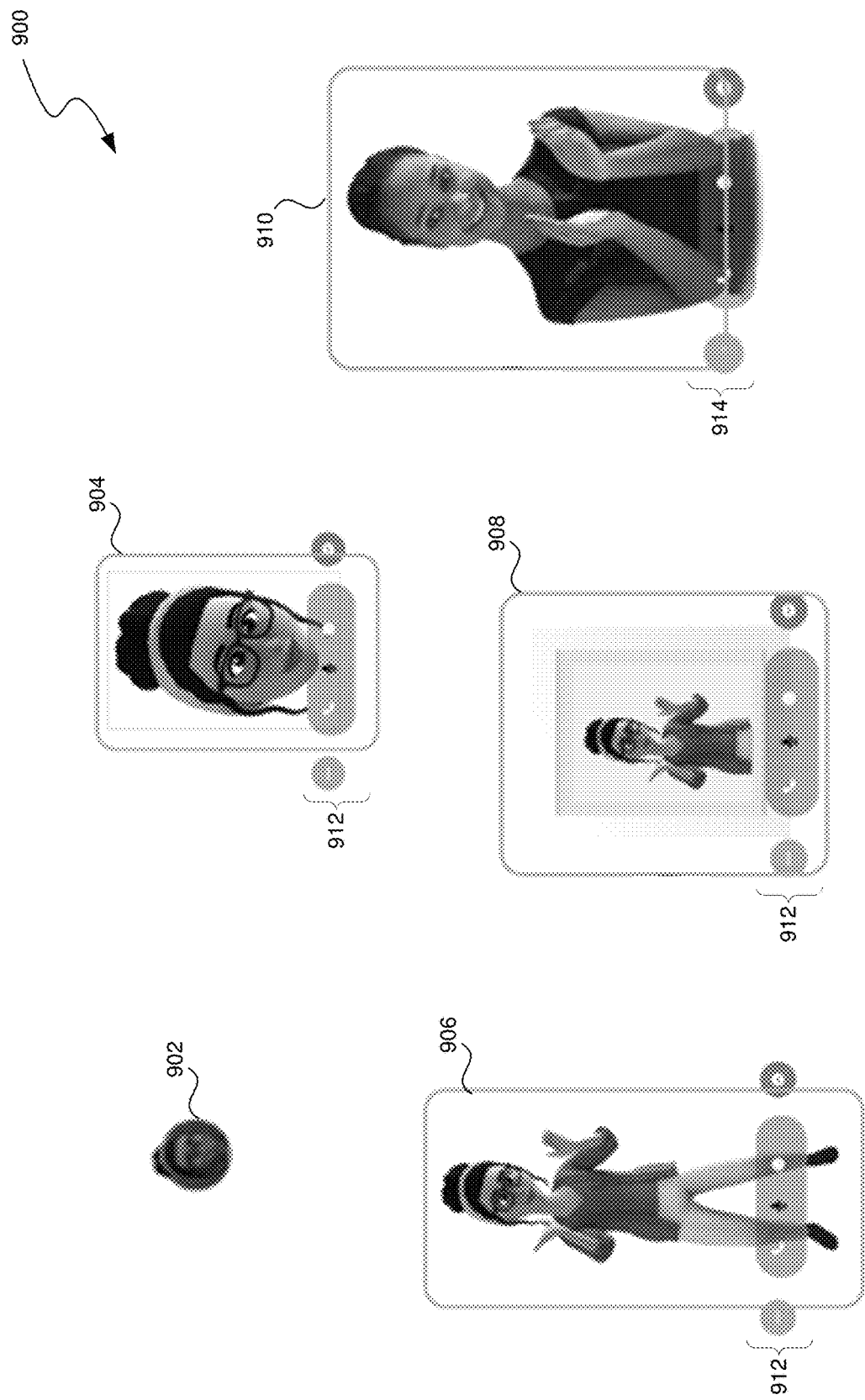
FIGS. 9A and 9B are conceptual diagrams and illustrating a template component of a person object with multiple view states and an example set of contextual breakpoint transitions between the view states.
Figure 9B:
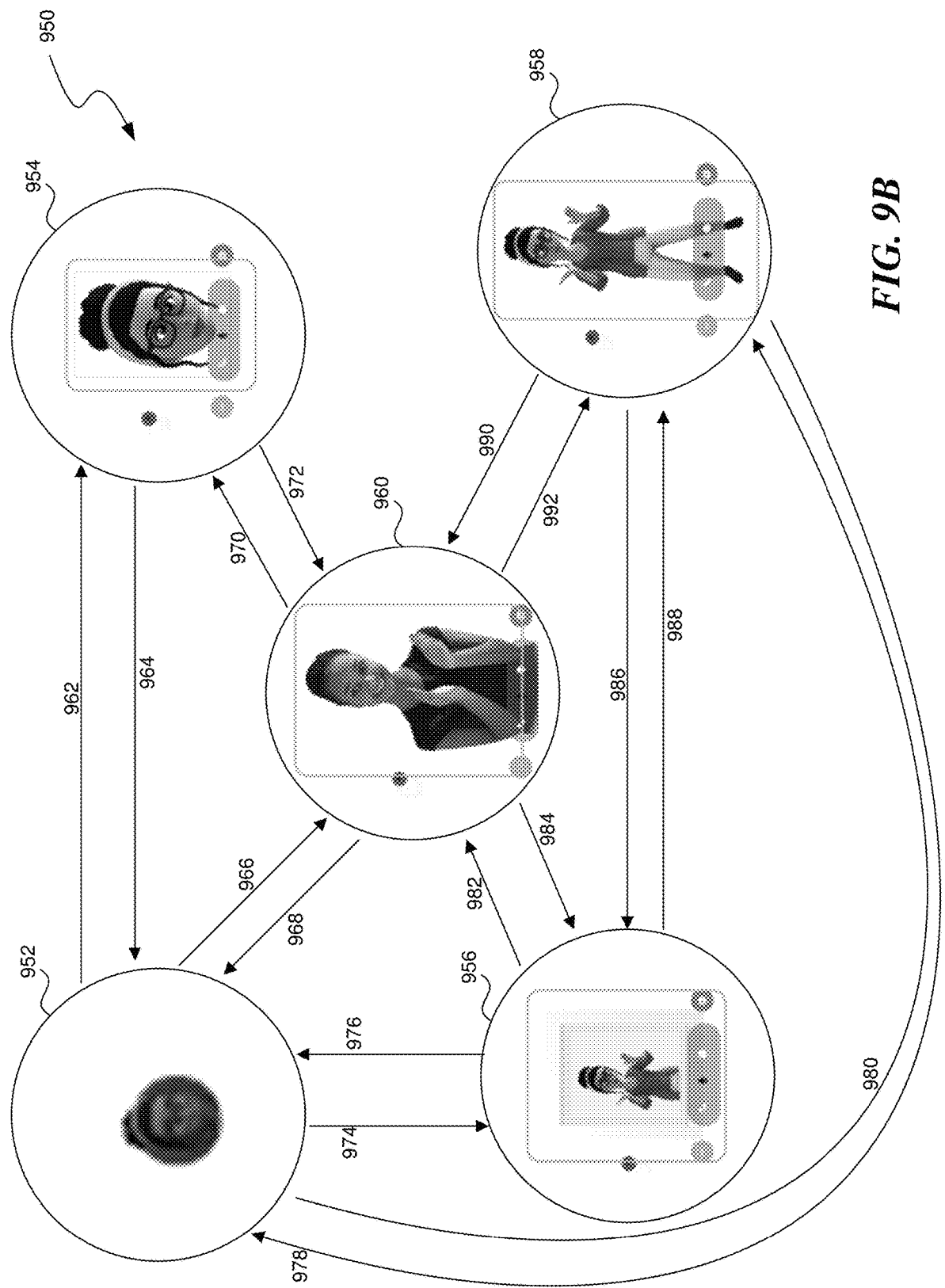

FIGS. 9A and 9B are conceptual diagrams 900 and 950 illustrating a template component of a person object with multiple view states and an example set of contextual breakpoint transitions between the view states. Conceptual diagram 900 illustrates five view states 902-910 of a person virtual object. Each view state defines which data elements of the virtual object are displayed, and where and how they are displayed within the container of the virtual object, while that view state is active. View state 902 is a glint view state where just an icon representation of the person virtual object is displayed—such as in a context where the virtual object has been inactive for a threshold period of time. View state 904 is a non-surface view state, where a head portion of an avatar, of the person represented by the virtual object, is displayed—such as in a context where the virtual object is active but is not attached to any surface. View state 906 is a horizontal surface view state, where a complete avatar, of the person represented by the virtual object, is displayed—such as in a context where the virtual object is active and is attached to a horizontal surface. View state 908 is a vertical surface view state, where a flat representation (i.e., virtual photo) of a top portion of an avatar, of the person represented by the virtual object, is displayed—such as in a context where the virtual object is active and is attached to a vertical surface. View states 904-908 also include UI elements 912, which include a consistent set of UI controls for interacting with a person virtual object in an active state. View state 910 is a holographic view state, where a live hologram, of the person represented by the virtual object, is displayed—such as in a context where there is an ongoing holographic call between the viewing user and the person represented by the virtual object. View state 914 also includes UI elements 914, which include a set of UI controls for controlling a holographic call.

Conceptual diagram 950 illustrates the view states 952-960, organized into a state machine with contextual breakpoints represented by the lines 962-992. Each of the lines 952-992 in conceptual diagram 950 represents a contextual breakpoint, defined by an expression that, when an active view state has a line leading away from it and the expression for that line evaluates to true, the view state at the end of the line becomes the active view state. As an example, the expression corresponding to any of transition lines 966, 972, 982, and 990 to view state 960, can be the context that a holographic call has begun with the person represented by the person virtual object. Each of the expressions for lines 968, 984, 970, and 992 can be for the context that a holographic call ended and the previous view state before entering the view state 960 was the state at the end of that line. The expression for the contextual breakpoint corresponding to line 962 can be the context occurring that a user selects the virtual object while the virtual object is not anchored to a surface, the expression for the contextual breakpoint corresponding to line 974 can be the context occurring that a user selects the virtual object while the virtual object is anchored to a vertical surface, and the expression for the contextual breakpoint corresponding to line 980 can be the context occurring that a user selects the virtual object while the virtual object is anchored to a horizontal surface. The expression for the contextual breakpoint corresponding to lines 964, 976, and 978 can be the context occurring that a user has not focused her attention on the virtual object for a threshold amount of time. The expression for the contextual breakpoint corresponding to line 986 can be the virtual object having been moved from a horizontal to a vertical surface and the expression for the contextual breakpoint corresponding to line 988 can be the virtual object having been moved from a vertical to a horizontal surface. While conceptual diagram 950 illustrates some example view states, with some example contextual breakpoints, for a person virtual object, a person virtual object could have more, less, or other view states and these view states could have more, less, or other contextual breakpoints.

Figure 10:
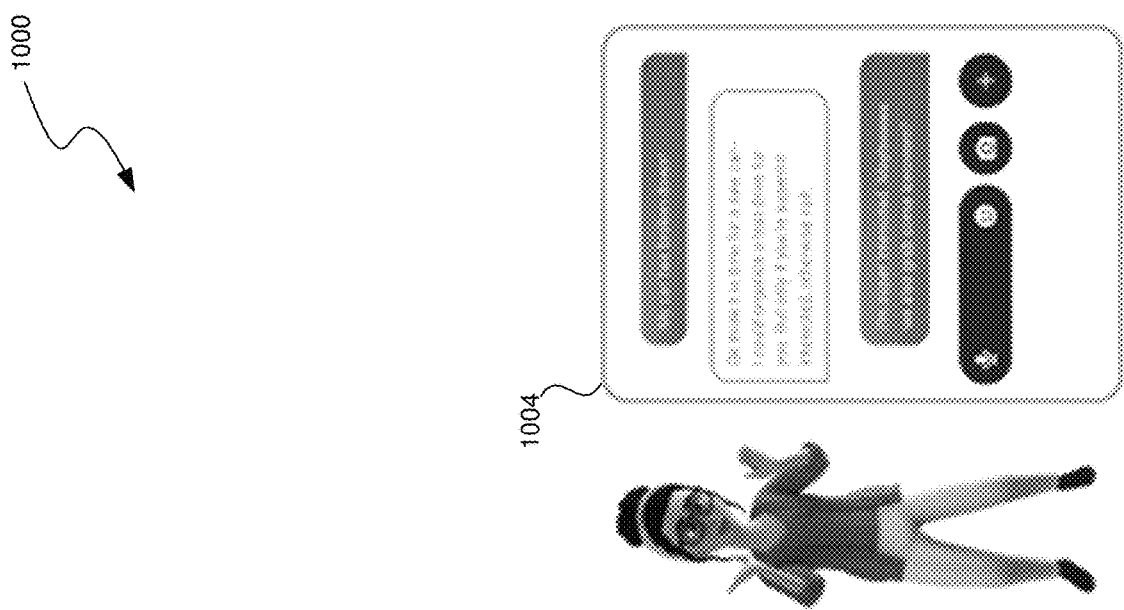
FIG. 10 is a conceptual diagram illustrating a controller component of an object and an example implementation of the controller component.
Figure 10:
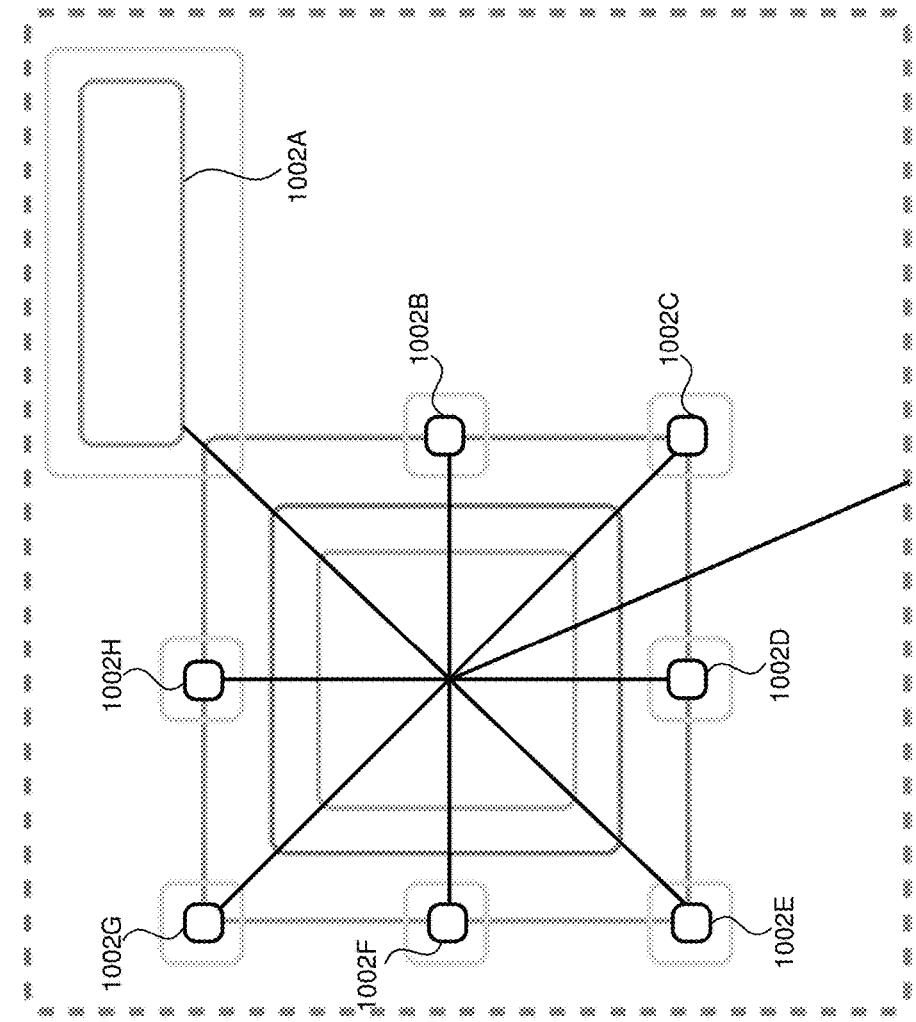

FIG. 10 is a conceptual diagram 1000 illustrating a controller component of an object and an example implementation of the controller component. The controller component can identify a context for the virtual object, such as user inputs, interactions with external elements (e.g., other objects, services, network data, etc.), and a world-state (e.g., where and how the virtual object is placed, a mode of the virtual object, other objects in the environment, people in the environment, etc.) The controller can also define logic for how the virtual object responds to aspects of this context, which in some cases includes providing input to the other components of the virtual object. Thus, on the upper left side of conceptual diagram 1000, the elements of the controller 1002 are illustrated as elements 1002A-H which connect to the data, template, and container components. Examples of the logic provided by the controller include: object behaviors (e.g., how the object reacts to other objects, inputs, and events, triggers for the object to take corresponding display, configuration, or other output actions, etc.), spatial behaviors (e.g., how the object moves, reacts to surface placement, sets view states in different contexts, etc.), component management (e.g., translating detected contexts and events into parameters or triggers for the container, data, or template components), data management (e.g., what data the virtual object retrieves or updates in response to given triggers), notifications (e.g., how the virtual object surfaces detected events in the artificial reality environment), privacy and security actions (e.g., what data and interfaces the virtual object makes available to the user, other virtual objects, and other entities and how the virtual object protects its internal resources), and/or system actions (e.g., changing states for power management, managing and requesting resources, hardware access, interfacing with the OS or other controlling application, thread execution management, etc.) By defining the controller as internal to the virtual object, the virtual object becomes self-contained through scoping, as the controller is executed within the scope of the virtual object, the controller can use only resources and parameters of that virtual object.

The controller can also include definitions for how the virtual object plugs into other objects and systems. For example, the controller element 1002A defines a connection to a messaging system for a person virtual object. When the system is provided with a notification of a new message in a message thread where the person represented by the person virtual object is a participant, the controller can have logic to have a message thread virtual object, which is imbedded as a data element in the person virtual object, (illustrated here as virtual object 1004), displayed in the container. In some cases, this incoming message context may be a contextual breakpoint, which the controller passes to the template, casing a messaging view state for showing the thread data element to become active.

Figure 11:
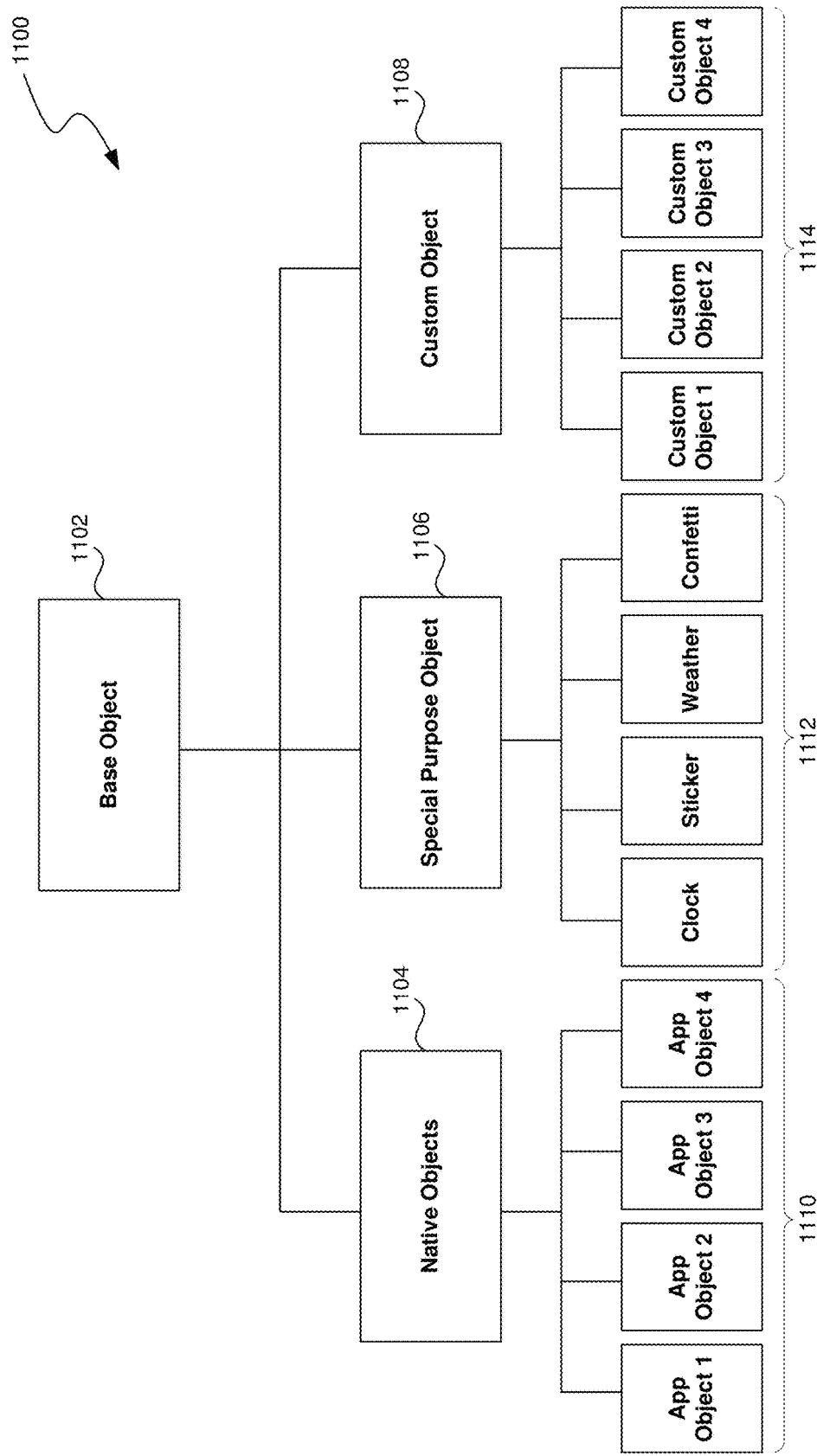
FIG. 11 is a conceptual diagram illustrating an example object hierarchy.

FIG. 11 is a conceptual diagram 1100 illustrating an example object hierarchy. Each object in the object hierarchy is an object definition. Some of these object definitions can be used by an application to instantiate an instance of that object, by passing parameters (e.g., passed to a constructor function) to specify specific data for the fields defined in the object definition. The objects hierarchy shown in conceptual diagram 1100 is an example, but the disclosed technology includes other hierarchies with additional, alternate, or fewer object definitions.

The object hierarchy includes a root base object 1102, in a first level, from which all other objects descend. The base object includes various low-level and external connections, data element fields, and logic, which all other virtual objects can inherit. For example, the base object can include an ID field, UI data elements, functions for displaying a notification; basic physics and movement patterns for virtual objects; privacy and security actions (e.g., what data and interfaces the virtual object makes available to the user, other virtual objects, and other entities and how the virtual object protects its internal resources); system actions (e.g., changing states for power management, managing and requesting resources, hardware access, interfacing with the OS or other controlling application, thread execution management, etc.); a standard template; etc. Additional examples of features that a base object can include are provided below in relation to FIG. 13.

In the second level extending the base object, the hierarchy includes set of native objects 1104, as special purpose object 1106, and a custom object 1108. These virtual objects in the second level initially inherit the components of the base object, while adding, replacing, or removing some functionality, external connections, data, logic, view states, etc.

Figure 12:
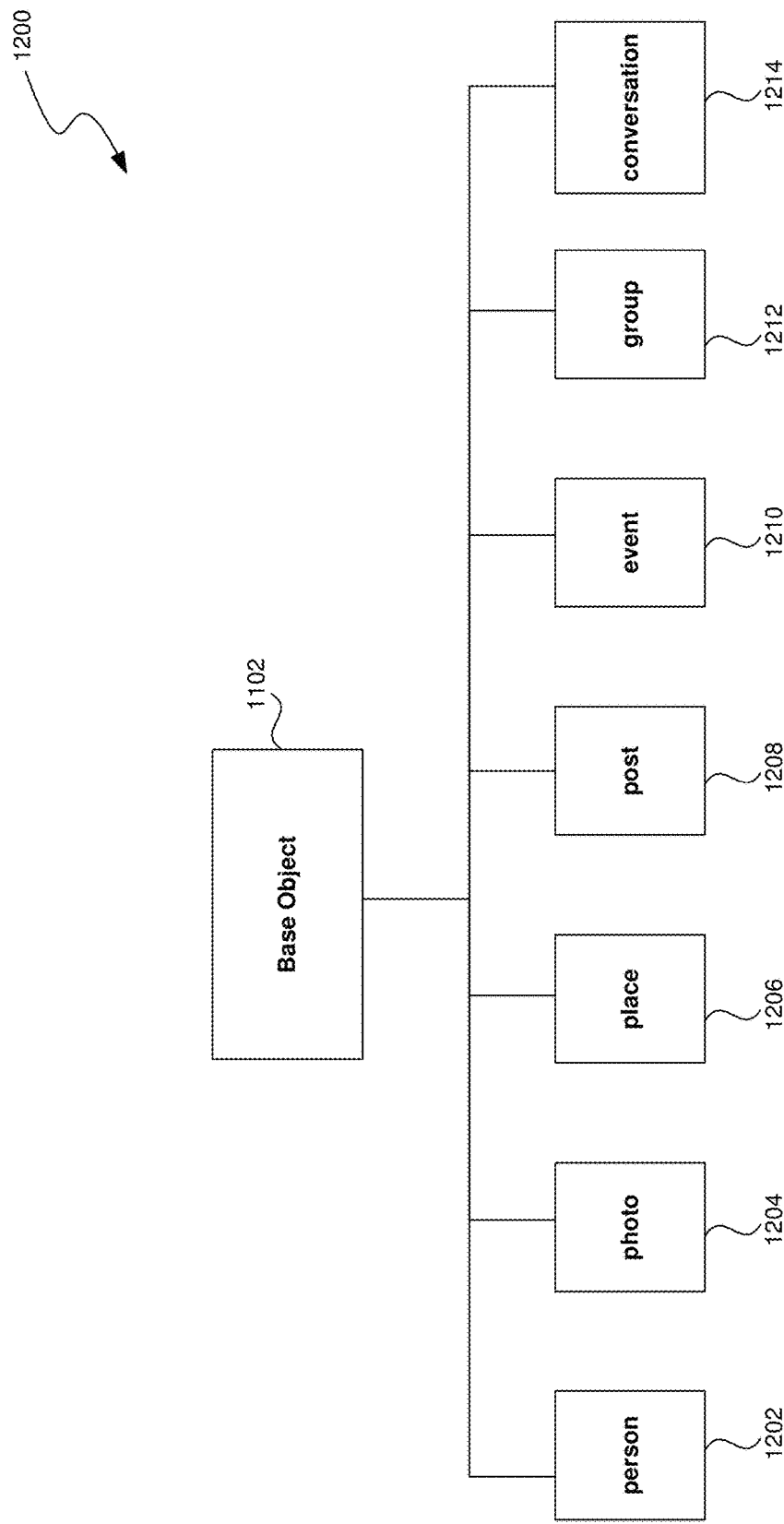
FIG. 12 is a conceptual diagram illustrating an example native objects portion of an object hierarchy.

The native objects 1104 can include a set of commonly used virtual object definitions that various applications can instantiate. Because these objects A) inherit components from the base object and B) are used by multiple applications across the artificial reality system, users will have established usage patterns for these objects and their functionality will be standard and expected. FIG. 12 is a conceptual diagram 1200 illustrating an example native objects portion of the object hierarchy. Examples of some of the native objects include a person native virtual object 1202, a photo native virtual object 1204, a place native virtual object 1206, a social media post native virtual object 1208, an event native virtual object 1210, a group native virtual object 1212, and a conversation native virtual object 1214. Additional examples of features of some native objects are provided below in relation to FIGS. 14-18. App objects 1110 each extend one of the native objects 1104, allowing individual applications to create object definition versions of the native object definitions, which add, modify, or remove functionality from the native object that object extends. For example, a person app object can extend the person native virtual object 1202, allowing for that person app object to connect to an additional or alternate social media platform, provide a different type of avatar display, add additional communication connections for the person, define additional ways to notify or receive notifications from the represented person, etc. This extension of app objects from the native objects allows such extended objects to inherit the secure and consistent experience users expect for particular types of native objects, while giving developers the freedom to customize the virtual objects to their specifications.

The special purpose object 1106 can include a custom container and template for content items which may be commonly used, imported from other platforms, and/or are user defined. Such a special purpose object can be a quasi-native catch-all object for content items for which users should have a consistent experience and for which developers should be able to easily create, but that do not fall into the other native object categories. Thus, a developer can extend the special purpose object, as one of special purpose objects 1112, to quickly create a useable object with standard functionality. For example, the special purpose objects 1112 shown in conceptual diagram 1100 include a clock 3D model, a sticker decal, a weather widget, and a confetti animation. The confetti animation, for example, may simply be created by defining the virtual object as an extension of the special purpose object 1106 and specifying a 3D animation data element, to use with the default special purpose object 1106's container, other data, templates, and controller. As another example, some of the special purpose objects 1112 can be automatically crated by importing existing content from another system. For example, a variety of 3D content may exist for another platform, such as user generated AR content, 3D models of shopping items from a retailer, features scanned from the world by a mapping system, etc. These items can be paired with a set of parameters used by that system and then created as items in special purpose objects 1112, inheriting the necessary components to instantiate and use them in an artificial reality environment.

The custom object 1108 and its subsequent extension objects 1114 represent additional objects that developers can create that inherit some basic content and/or functionality from the base object 1102, allowing them to be used in an artificial reality environment, while providing full flexibility to the developer to define and customize other aspects of the objects. A developer can create one or move versions of the branch of custom object 1108 and its extensions 1114, e.g., defining any custom container, data, template, and/or controller component or component's elements. As discussed above, a virtual object can be a compound object, thus a developer can still easily create a complex and flexible custom object branch, that still has elements that are familiar to users, by including any of the native objects 1104, app objects 1110, or special purpose objects 1112, as data elements of a custom object.

Figure 13:
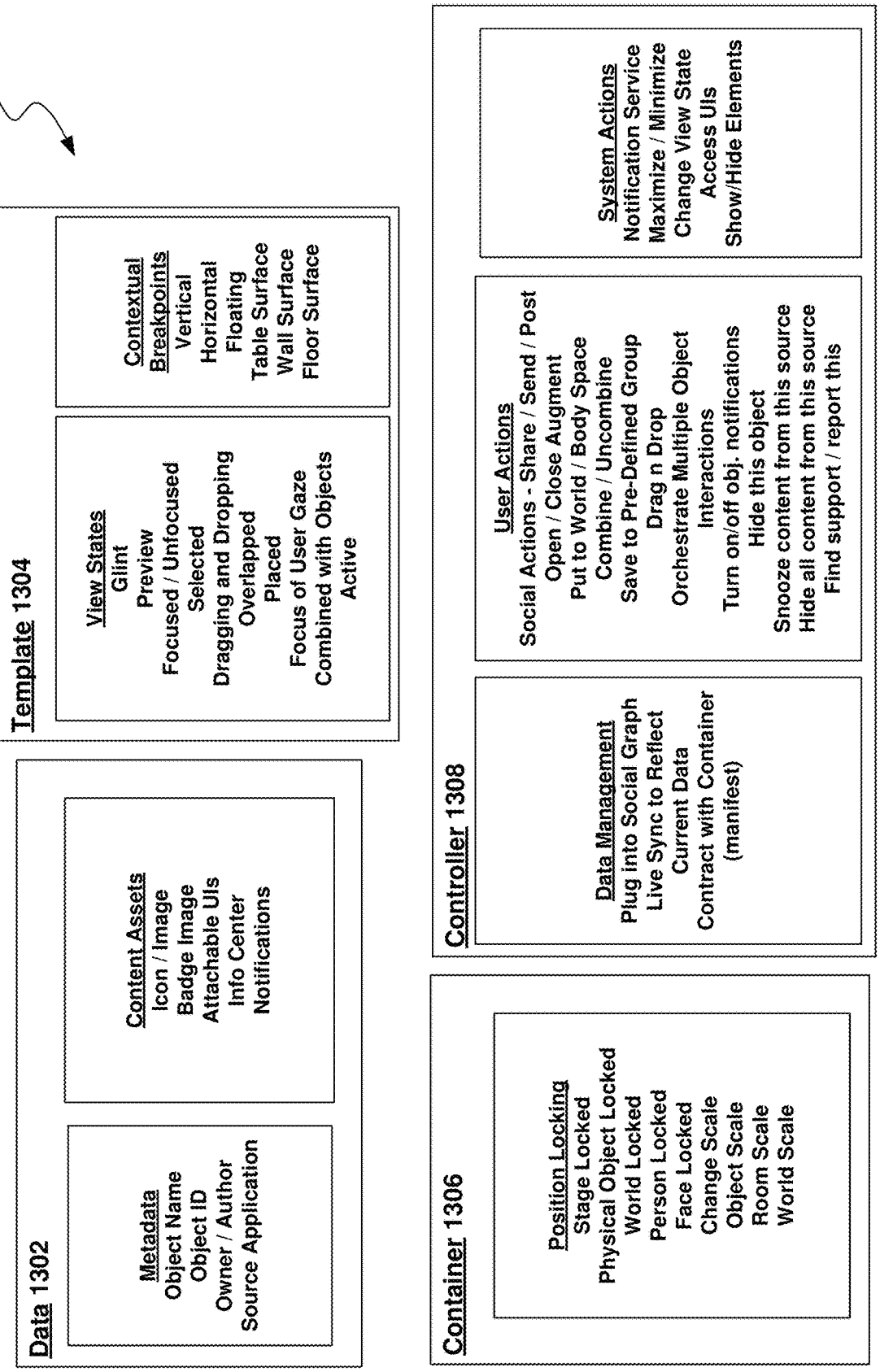
FIG. 13 is a conceptual diagram illustrating an example description of a base object.

FIG. 13 is a conceptual diagram 1300 illustrating an example description of a base object (e.g., base object 1102). Conceptual diagram 1300 includes components of a base virtual object including a data component 1302, a template component 1304, a container component 1306, and a controller component 1308. Each of these components includes some basic elements that can be passed to other virtual objects that extend this base virtual object. The data component 1302 includes a default set of meta data and content assets. The template component 1304 includes a default set of view states and contextual breakpoint definitions. The container component 1306 includes a defaults set of container manifest parameters for positioning and orientating a container. The controller component 1308 includes a default set of data management logic, a default set of user action logic, and a default set of system action logic.

Figure 14:
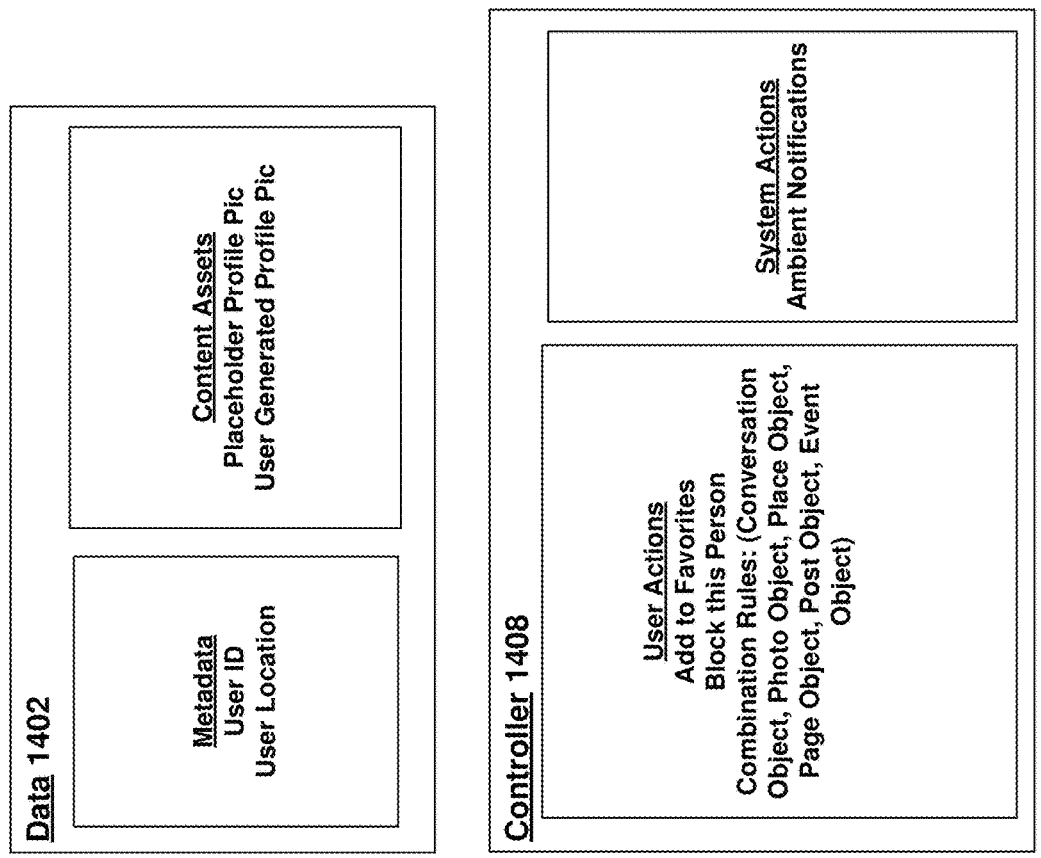
FIG. 14 is a conceptual diagram illustrating an example description of a native person object.

FIG. 14 is a conceptual diagram 1400 illustrating an example description of a native person object (e.g., native person object 1202). The native person object extends to base object described in conceptual diagram 1300, inheriting its data, template, container, and controller components, and includes additions such as: data 1402 with additional meta data and additional content assets and controller 1408 with additional user actions and additional system actions.

Figure 15:
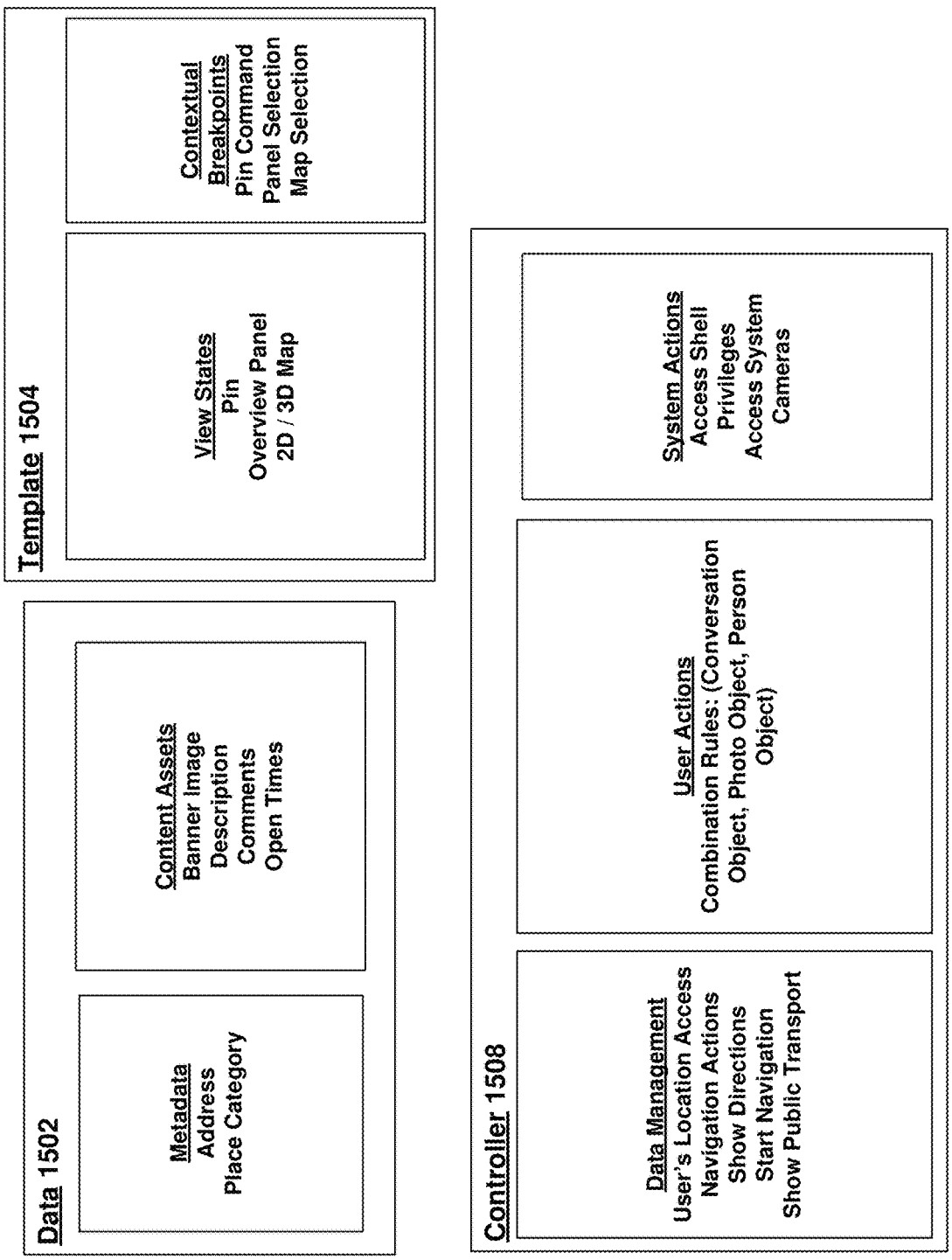
FIG. 15 is a conceptual diagram illustrating an example description of a native place object.

FIG. 15 is a conceptual diagram 1500 illustrating an example description of a native place object (e.g., native place object 1206). The native place object extends to base object described in conceptual diagram 1300, inheriting its data, template, container, and controller components, and includes additions such as: data 1502 with additional meta data and additional content assets, template 1504 with additional view sates and contextual breakpoints, and controller 1508 with additional data management, user actions, and additional system actions.

Figure 16:
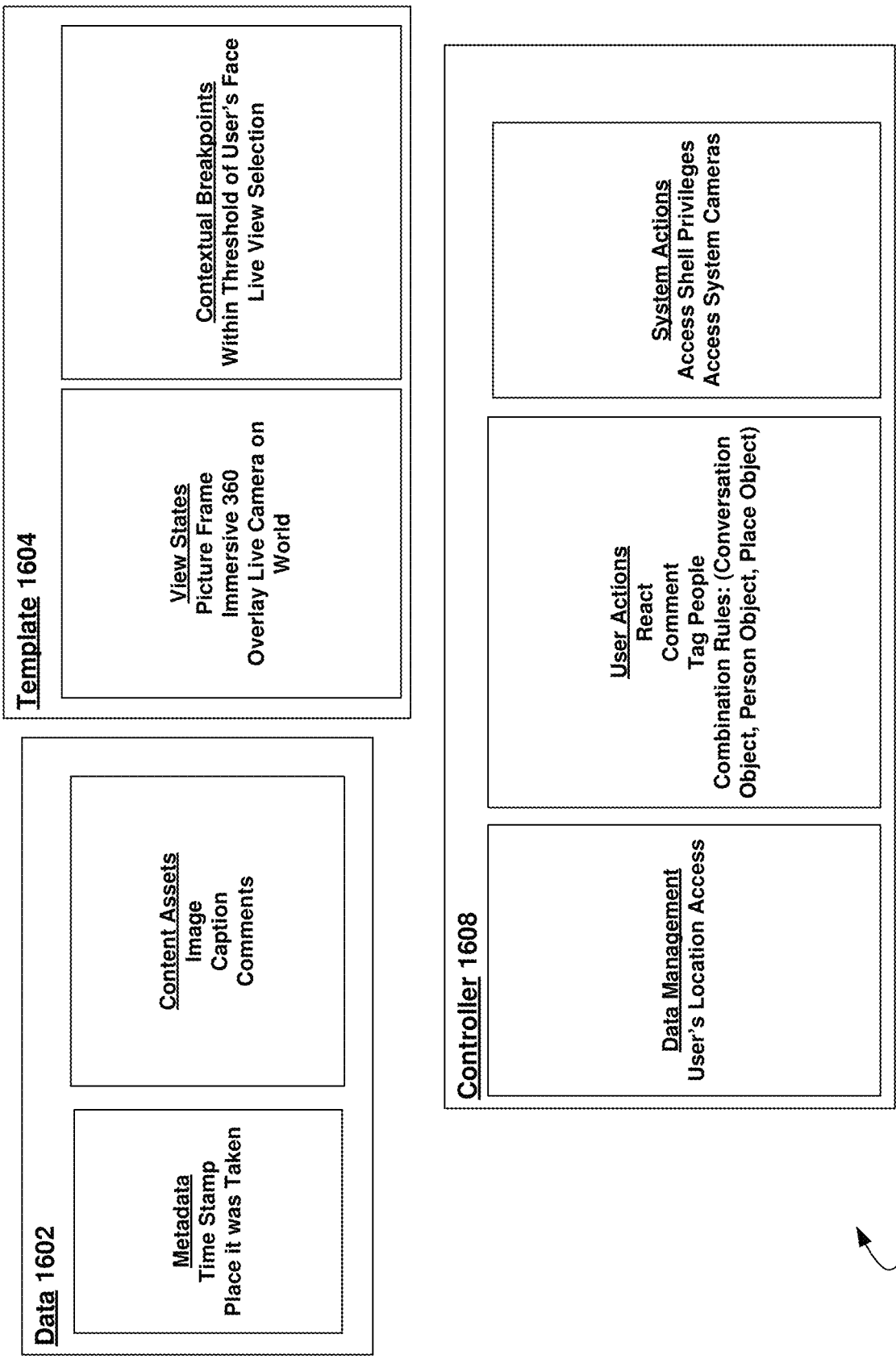
FIG. 16 is a conceptual diagram illustrating an example description of a native photo object.

FIG. 16 is a conceptual diagram 1600 illustrating an example description of a native photo object (e.g., native photo object 1204). The native photo object extends to base object described in conceptual diagram 1300, inheriting its data, template, container, and controller components, and includes additions such as: data 1602 with additional meta data and additional content assets, template 1604 with additional view sates and contextual breakpoints, and controller 1608 with additional data management, user actions, and additional system actions.

Figure 17:
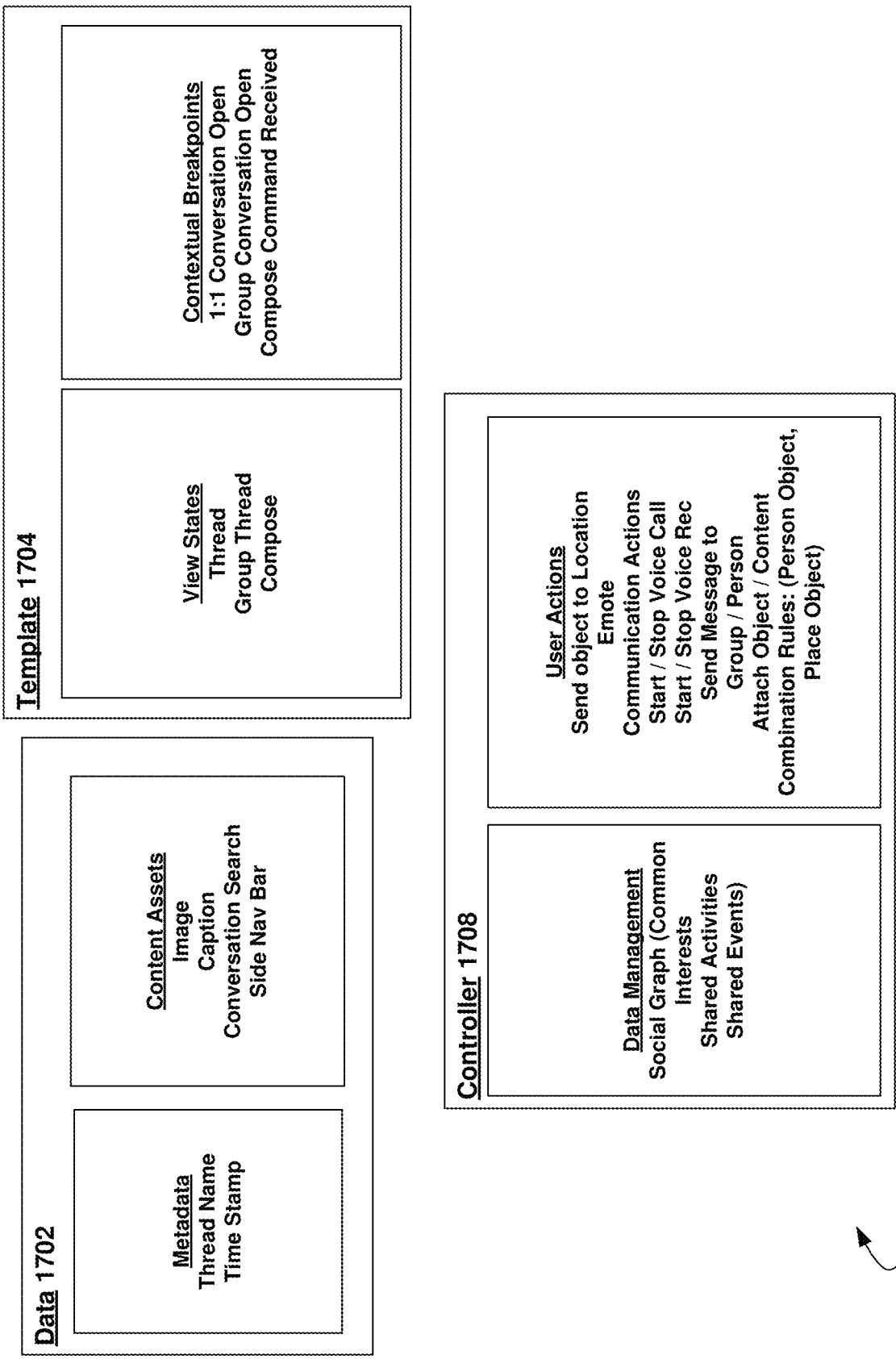
FIG. 17 is a conceptual diagram illustrating an example description of a native conversation object.

FIG. 17 is a conceptual diagram 1700 illustrating an example description of a native conversation object (e.g., native conversation object 1214). The native conversation object extends to base object described in conceptual diagram 1300, inheriting its data, template, container, and controller components, and includes additions such as: data 1702 with additional meta data and additional content assets, template 1704 with additional view sates and contextual breakpoints, and controller 1708 with additional data management and user actions.

Figure 18:
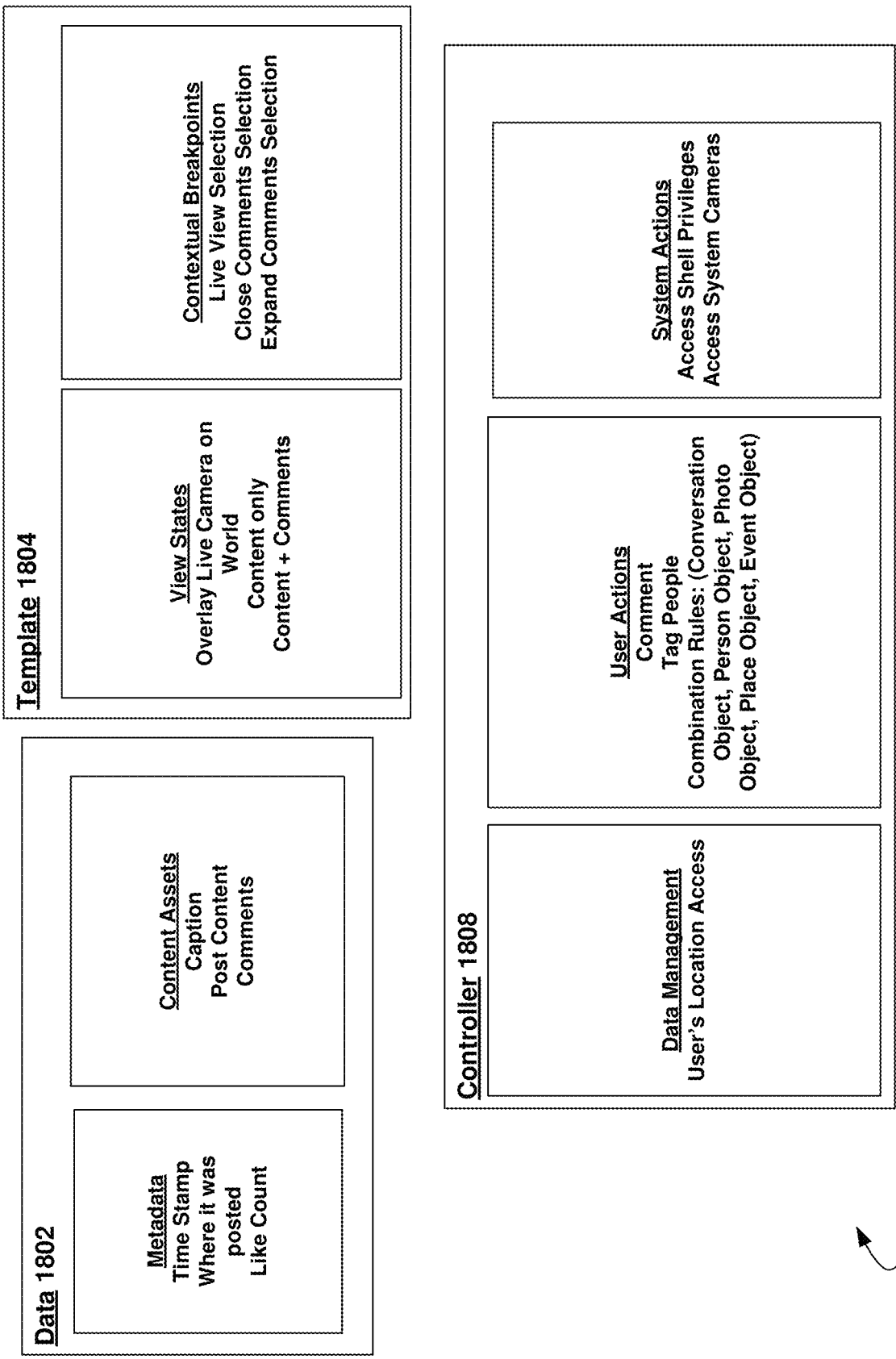
FIG. 18 is a conceptual diagram illustrating an example description of a native post object.

FIG. 18 is a conceptual diagram 1800 illustrating an example description of a native post object (e.g., native post object 1208). The native post object extends to base object described in conceptual diagram 1300, inheriting its data, template, container, and controller components, and includes additions such as: data 1802 with additional meta data and additional content assets, template 1804 with additional view sates and contextual breakpoints, and controller 1808 with additional data management, user actions, and additional system actions.

Those skilled in the art will appreciate that the components illustrated in FIGS. 1-18 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 19:
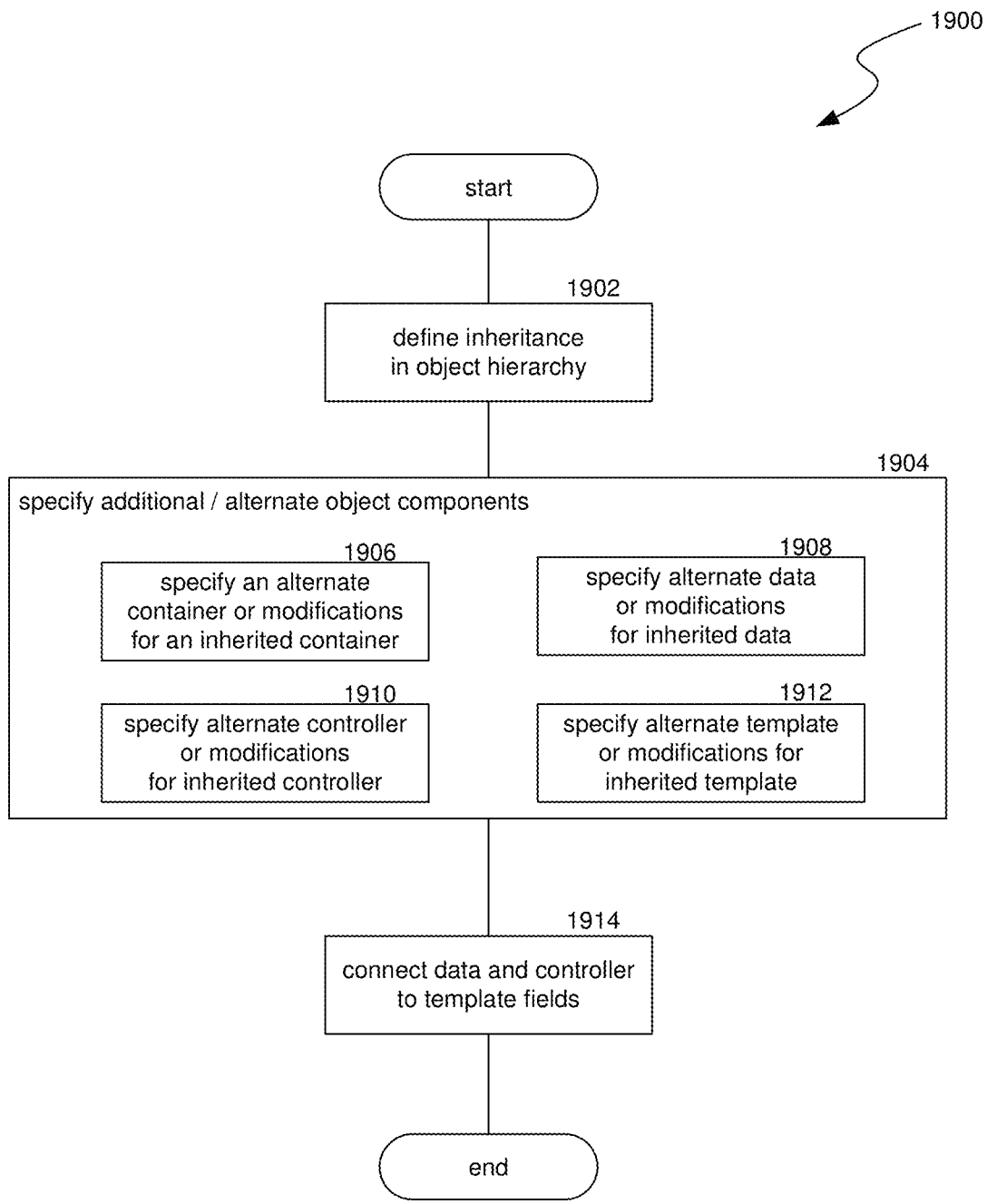
FIG. 19 is a flow diagram illustrating a process used in some implementations for defining a virtual object with a modular design process.

FIG. 19 is a flow diagram illustrating a process 1900 used in some implementations for defining a virtual object with a modular design process. In various implementations, process 1900 can be performed on a client device of a developer specifying the components of a virtual object or on a server providing service to such a client device.

At block 1902, process 1900 can receive a definition of an inheritance, in an object hierarchy, for a new object. The hierarchy can be a collection of virtual objects where each virtual object, other than a root virtual object of the hierarchy, is a child of one other virtual object in the hierarchy, as discussed above in relation to FIGS. 11 and 12. Each virtual object can initially inherit the components of its parent virtual object, which can then be replaced or modified with process 1900. Block 1902 can include specifying which object in the hierarchy is the parent of the new virtual object, thus defining the initial set of components inherited from that parent virtual object. For example, when virtual object B is created to inherit from (also referred to as "extending") virtual object A, and virtual object A has a template T, virtual object B automatically has template T, which can be modified or overridden at block 1912 discussed below.

At block 1904, process 1900 can specify additional and/or alternate container, data, template and/or controller components from those inherited from the new virtual object's parent virtual object in the hierarchy. In various implementations, process 1900 can provide details of the inherited object components which a user can drill into to change individual values or replace with completely different components. In some implementations, selecting a different component can include providing a definition for a new component or selecting an existing component, e.g., from a component prefab library.

A virtual object container (also referred to as an "augment") is created when the virtual object is instantiated by an application sending a request to the controlling application with the container manifest, specifying basic properties of the container such as types of surfaces or locations where the container can be placed, how the container will display itself in different modes, initial location, size, and orientation, etc. In some implementations, a container can have a specific pre-defined type (e.g., person, 2D media, post, event, or 3D model), and a default manifest for that type can be used. The controlling application creates a container based on the manifest and provides a handle to it back to the requesting application. This requester can then write content into the container (including writing different versions for different display properties specified in the manifest). The controlling application can maintain control of where the container can be displayed and which display properties are invoked, according to allowed positions and display properties specified in the manifest. Additional details on containers are provided in U.S. patent application Ser. No. 17/008,478, titled "Artificial Reality Augments and Surfaces," and filed on Aug. 31, 2020, which is herein incorporated by reference in its entirety. Specifying changes to or an alternate container, at block 1906, can include changing or defining a set of parameters (i.e., a "manifest") that an application instantiating the virtual object will use to request, from an application controlling an artificial reality environment (e.g., operating system, shell application, etc.), a volume (2D or 3D) to write into. Thus, at block 1906, process 1900 can receive a manifest definition or updates to the manifest inherited from the parent virtual object, e.g., by changing the type, size, possible anchor types or locations, etc.

The new virtual object's data can include, e.g., visual elements, state definitions, parameters and meta-data, attachable UIs, other objects used inside this object (i.e., "compound objects"), etc. While a virtual object can have any number and type of data elements, an example virtual object can have data defining various 2D and 3D models it can display in its container; parameters such as an ID, name, corresponding social media entity ID, status, originating application, a set of UI elements, etc. See additional example virtual objects with some of their data definitions in FIGS. 8 and 13-18. Specifying additional and/or alternate data, at block 1908, for the new virtual object can include adding new data to that inherited from the parent virtual object, removing data from that inherited from the parent virtual object, and/or redefining data elements inherited from the parent virtual object. In various implementations, the specified data can be a definition of the location of the data, e.g., a link, file storage location, or other storage path. An application that will instantiate the virtual object can supply the given data at the defined data location (e.g., upon installation or when the virtual object is retrieved) or the instantiation process can include retrieving the data from a remote location specified by the storage path. In some implementations, the data can be dynamic, such that as it changes in the remote location, those changes are reflected in the virtual object.

A virtual object's controller can define logic and rules specifying how the virtual object interacts with external elements (e.g., other objects, services, network data, etc.) and responds to a determined world-state/context and user input. In various implementations, examples of logic the controller can define include: object behaviors (e.g., how the object reacts to other objects, inputs, and events; triggers for the object to take corresponding display, configuration, or other output actions), spatial behaviors (e.g., how the object moves, reacts to surface placement, sets view states in different contexts, etc.), component management (e.g., translating detected contexts and events into parameters or triggers for the container, data, or template components), data management (e.g., what data the virtual object retrieves or updates in response to given triggers), notifications (e.g., how the virtual object surfaces detected events in the artificial reality environment), privacy and security actions (e.g., what data and interfaces the virtual object makes available to the user, other virtual objects, and other entities and how the virtual object protects its internal resources), and/or system actions (e.g., changing states for power management, managing and requesting resources, hardware access, interfacing with the OS or other controlling application, thread execution management, etc.) The controller can also include definitions for how the virtual object plugs into other objects and systems. For example, a controller for a person virtual object can define a connection (e.g., via a person identifier) to an entity of a social media platform's social graph. Through this connection, the person virtual object can be associated with friends, interests, events, etc. as defined in the social graph and the virtual object can be updated according to events occurring on the social platform. By defining the controller as internal to the virtual object, the virtual object becomes self-contained through scoping, as the controller is executed within the scope of the virtual object, the controller can use only resources and parameters of that virtual object. Specifying the virtual object's controller at block 1910 can include changing any given ones of the rules/logic inherited from the parent virtual object, specifying additional rules/logic, and/or removing inherited rules/logic.

A template component of a virtual object can include multiple view states, where each view state defines how the virtual object presents itself—such as by setting a configuration of the container, mapping which data elements of the virtual object are displayed and where within the container, which UI elements are active, or other output for the virtual object. The template can act as a state machine where each view state is a state in the state machine and there is contextual breakpoint logic that defines when the virtual object transitions between the view states. Additional details on view states and contextual breakpoints are discussed above in relation to FIGS. 9A and 9B and below in relation to FIG. 20. At block 1912, process 1900 can specify an alternate template or modifications for an inherited template. This can include replacing, removing, or adding view states and/or changing contextual breakpoints for transitioning between the view states in a template inherited from the parent virtual object or receiving a selection of a prefab template (e.g., defined using process 2000 discussed below). In some cases, process 2000, described below, can be used to define a template for a new virtual object.

At block 1914, process 1900 can define connections between the components specified at block 1904. For example, this can include specifying which objects from block 1908 map into view state fields from block 1912; which logic or rules from the controller defined at block 1910 map to elements of the container, data, or template components; which view states from block 1912 map to which container configurations defined at block 1906, etc. Block 1914 can also include filling meta-data fields in the template (e.g., placement, name, ID, etc.) or hooking the virtual object to live data sources defined by the connections in the controller. Process 1900 can then store the defined virtual object for future instantiation before it ends.

Figure 20:
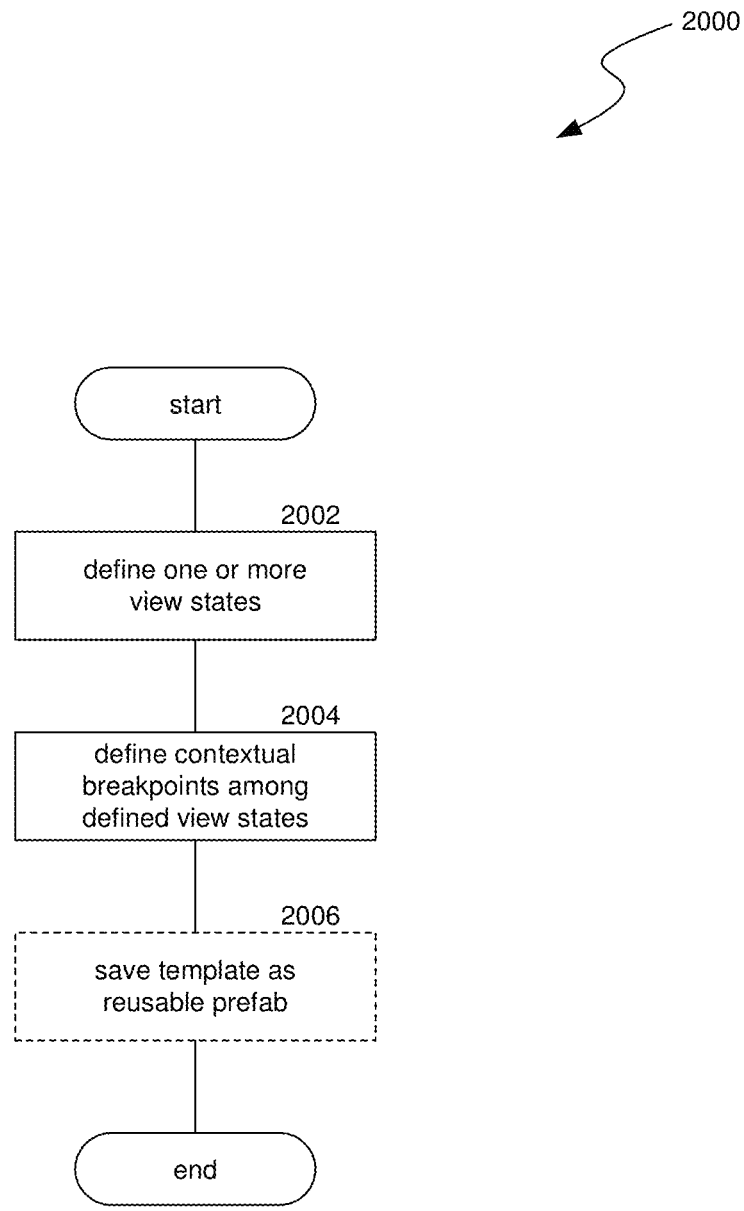
FIG. 20 is a flow diagram illustrating a process used in some implementations for constructing a reusable template.

FIG. 20 is a flow diagram illustrating a process 2000 used in some implementations for constructing a reusable template. In various implementations, process 2000 can be performed on a client device of a developer specifying a virtual object template or on a server providing service to such a client device. In some cases, process 2000 can be performed as a sub-process of process 1900, e.g., at block 1912. The template system can adjust performance limitations on a per-template basis, while reducing the payload of containers to make them instant and performant.

At block 2002, process 2000 can define one or more view states for a template, where each view state defines how a virtual object presents itself—such as by setting a configuration of the container, mapping which data elements of the virtual object are displayed and where within the container, which UI elements are active, or other output for the virtual object. Example view states that can be in a template are: a "glint" view state showing only an icon representation of the virtual object, a "preview" view state showing low resolution or simplified versions of content from a selected view state, a "notify" view state providing information on an event related to the virtual object (e.g., a message from a network source arrived in relation to the virtual object), a "selected" view state showing a full 3D version of the virtual object, a "quick actions" view state showing UI to take common actions on the virtual object, a "horizontal surface" view state displaying the virtual object as a 2D panel, a "vertical surface" view state showing the virtual object as a 3D object resting on a surface, etc. Each view state can specify fields specifying a data element of the virtual object to output and parameters for that output such as a size, orientation, location within the virtual object's container, volume, mode, etc. In some cases, one or more of the view states can be selected from an existing library of view states or from the templates of existing virtual objects.

At block 2004, process 2000 can define directed links with corresponding contextual breakpoint expressions between the view states defined in block 2002. A template can act as a state machine where each view state is a state in the state machine and there is contextual breakpoint logic that defines when the virtual object transitions between the view states. A contextual breakpoint can be an expression that is evaluated based on determined context of the virtual object, such as what type of surface or anchor point it is attached to, a mode of the artificial reality device displaying the virtual object, user inputs, identified system events, etc. Each contextual breakpoint can define a directed link between two view states in the template, and when A) a view state at the beginning of such a link is active and B) the contextual breakpoint expression evaluates to true, the view state at the end of the link can become the active view state. Each contextual breakpoint can be defined with a directed link between two view states and can specify binary values for whether certain contextual features, events, system status, etc. occur, along with combination logic (e.g., AND, OR, NOT, XOR, etc.) between these values, to define expression that can overall evaluate to true or false depending on circumstances identified by an artificial reality device.

While any block can be removed or rearranged in various implementations, block 2006 is shown in dashed lines to indicate there are specific instances where block 2006 is skipped. At block 2006, process 2000 can save the defined template as a reusable prefabrication or "prefab." This can include storing the template locally, sharing the template with another user, or saving the template to a library (e.g., cloud based) for future incorporation in a virtual object. Following block 2006 (or block 2004 if block 2006 is skipped) process 2000 can end.

Reference in this specification to "implementations" (e.g., "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle-specified number of items, or that an item under comparison has a value within a middle-specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method of defining a virtual object, for access by an application program executed on a processing system, the method comprising:
    creating, using one or more memories and one or more processors, a data structure stored in a computer system memory, the data structure including information used by the application program executed on the processing system and including:
        a data component defining multiple attribute data elements, the attribute data elements including at least visual elements, parameters, and links to external data;
        a manifest for a container component that defines a volume that the virtual object is authorized to write into;
        a controller component defining logic controlling how the virtual object responds to contexts, the contexts including one or more of: user actions, a determined world state, outputs from system services, outputs from other applications, or a combination thereof; and
        a template component defining multiple view states with contextual breakpoints specifying transitions between the multiple view states.

2. The method of claim 1,
    wherein one or more of the data component, the manifest for the container component, the controller component, and/or the template component is based on a corresponding component from a parent object that the virtual object extends in an object hierarchy; and
    wherein at least one of the data component, the manifest for the container component, the controller component, and/or the template component is modified from the version in the parent object in the object hierarchy.

3. The method of claim 1, wherein one or more of the data component, the manifest for the container component, the controller component, and/or the template component is based on a corresponding component from a parent object that the virtual object extends in an object hierarchy.

4. The method of claim 3:
wherein the object hierarchy includes at least a root object from which all other objects in the object hierarchy descend; and
wherein the object hierarchy includes at least a set of native objects defining at least a native person object and a native photo object.

5. The method of claim 3,
wherein the object hierarchy includes at least a root object from which all other objects in the object hierarchy descend; and
wherein the object hierarchy includes at least a special purpose object defining a custom container component and a custom template component for content items imported from another platform, wherein the special purpose object inherits functionality from the root object permitting instances of the special purpose object, each with an imported content item, to exist in an artificial reality environment.

6. The method of claim 1, wherein the controller component further defines logic that causes the virtual object to react to one or more of: which other people or objects are in the vicinity, how the virtual object is grouped with or linked to other objects, a state associated with a current user, or a combination thereof.

7. The method of claim 1, wherein the controller component includes definitions of how the virtual object is associated with other virtual objects.

8. The method of claim 1, wherein the controller component includes connection specifics defining connections between the virtual object and external services and defining how the virtual object responds to events from those external services.

9. The method of claim 1, wherein each of the multiple view states, when that view state is the active view state for the virtual object, controls what data elements the virtual object is presenting and how the virtual object is presenting those data elements.

10. The method of claim 1, wherein the template component is a state machine with each view state being a state of the state machine and each contextual breakpoints being an expression that, for a particular state and when the expression evaluates to true, causes a transition from the particular state to another state.

11. A non-transitory memory for storing a definition of a virtual object, for access by an application program executed on a processing system, the memory comprising:
a data structure stored in the memory, the data structure including information used by the application program and including:
a data component defining multiple attribute data elements, the attribute data elements including at least visual elements, parameters, and links to external data;
a manifest for a container component that defines a volume that the virtual object is authorized to write into;
a controller component defining logic controlling how the virtual object responds to contexts, the contexts including one or more of: user actions, a determined world state, outputs from system services, outputs from other applications, or a combination thereof; and
a template component defining multiple view states with contextual breakpoints specifying transitions between the multiple view states.

12. The non-transitory memory of claim 11,
wherein one or more of the data component, the manifest for the container component, the controller component, and/or the template component is based on a corresponding component from a parent object that the virtual object extends in an object hierarchy; and
wherein at least one of the data component, the manifest for the container component, the controller component, and/or the template component is modified from the version in the parent object in the object hierarchy.

13. The non-transitory memory of claim 11, wherein one or more of the data component, the manifest for the container component, the controller component, and/or the template component is based on a corresponding component from a parent object that the virtual object extends in an object hierarchy.

14. The non-transitory memory of claim 13:
wherein the object hierarchy includes at least a root object from which all other objects in the object hierarchy descend; and
wherein the object hierarchy includes at least a set of native objects defining at least a native person object and a native photo object.

15. The non-transitory memory of claim 13,
wherein the object hierarchy includes at least a root object; and
wherein the object hierarchy includes at least a special purpose object defining a custom container component and a custom template component for content items imported from another platform, wherein the special purpose object inherits functionality from the root object permitting instances of the special purpose object, each with an imported content item, to exist in an artificial reality environment.

16. The non-transitory memory of claim 11, wherein the controller component further defines logic that causes the virtual object to react to one or more of: which other people or objects are in the vicinity, how the virtual object is grouped with or linked to other objects, a state associated with a current user, or a combination thereof.

17. The non-transitory memory of claim 11, wherein the controller component includes definitions of how the virtual object is associated with other virtual objects.

18. The non-transitory memory of claim 11, wherein the controller component includes connection specifics defining connections between the virtual object and one or more external services and defining how the virtual object responds to events from those one or more external services.

19. A computing system storing a definition of a virtual object, for access by an application program executed on the computing system, the computing system comprising:
one or more processors; and
one or more memories storing the definition of the virtual object including:
a data component defining multiple attribute data elements, the attribute data elements including at least visual elements, parameters, and links to external data;
a manifest for a container component that defines a volume that the virtual object is authorized to write into;

a controller component defining logic controlling how the virtual object responds to contexts, the contexts including one or more of: user actions, a determined world state, outputs from system services, outputs from other applications, or a combination thereof; and a template component defining multiple view states with contextual breakpoints specifying transitions between the multiple view states.

20. The computing system of claim 19, wherein each of the multiple view states, when that view state is the active view state for the virtual object, controls what data elements the virtual object is presenting and how the virtual object is presenting those data elements.

\* \* \* \* \*